US011279044B2

(12) United States Patent
Kapoor et al.

(10) Patent No.: US 11,279,044 B2
(45) Date of Patent: Mar. 22, 2022

(54) ROBOT INSTRUCTING APPARATUS, TEACHING PENDANT, AND METHOD OF INSTRUCTING A ROBOT

(71) Applicant: Yaskawa America, Inc., Waukegan, IL (US)

(72) Inventors: Chetan Kapoor, Austin, TX (US); Changbeom Park, Austin, TX (US)

(73) Assignee: YASKAWA AMERICA, INC., Waukegan, IL (US)

( * ) Notice: Subject to any disclaimer, the term of this patent is extended or adjusted under 35 U.S.C. 154(b) by 431 days.

(21) Appl. No.: 16/054,008

(22) Filed: Aug. 3, 2018

(65) Prior Publication Data

US 2020/0039082 A1  Feb. 6, 2020

(51) Int. Cl.
| G05B 15/00 | (2006.01) |
| G05B 19/00 | (2006.01) |
| B25J 13/06 | (2006.01) |
| B25J 9/16 | (2006.01) |
| G05B 19/427 | (2006.01) |

(52) U.S. Cl.
CPC ............... B25J 13/06 (2013.01); B25J 9/163 (2013.01); B25J 9/1656 (2013.01); B25J 9/1664 (2013.01); G05B 19/427 (2013.01); G05B 2219/36168 (2013.01); G05B 2219/37388 (2013.01); G05B 2219/39443 (2013.01)

(58) Field of Classification Search
CPC . B25J 13/06; B25J 9/1664; B25J 9/163; B25J 9/1656; G05B 2219/39443; G05B 2219/37388; G05B 2219/36168; G05B 19/427
See application file for complete search history.

(56) References Cited

U.S. PATENT DOCUMENTS

| 9,958,862 | B2 | 5/2018 | Kapoor et al. | |
| 2009/0005166 | A1* | 1/2009 | Sato | A63F 13/10 463/37 |
| 2015/0321351 | A1 | 11/2015 | Kapoor et al. | |
| 2016/0229052 | A1* | 8/2016 | Touma | B25J 9/161 |
| 2017/0203438 | A1* | 7/2017 | Guerin | B25J 9/1605 |
| 2018/0169859 | A1* | 6/2018 | Sugiyama | B25J 13/06 |
| 2018/0272526 | A1* | 9/2018 | Nagashima | B25J 9/1664 |

(Continued)

FOREIGN PATENT DOCUMENTS

CN  103492133 A  *  1/2014  ............ B25J 9/1643

OTHER PUBLICATIONS https://www.youtube.com/watch?v=4gDjgomANC4 (Year: 2014).*

(Continued)

*Primary Examiner* — Abby Y Lin
*Assistant Examiner* — Sohana Tanju Khayer
(74) *Attorney, Agent, or Firm* — Mori & Ward, LLP

(57) ABSTRACT

A robot instructing apparatus includes a teaching pendant having a display and an inclination device. The inclination device outputs an inclination of the teaching pendant based on the inclination of the teaching pendant about at least one horizontal axis. The robot instructing apparatus also includes at least one processor that generates movement instructions to change a posture of the robot based on the inclination of the teaching pendant output by the inclination device during a teaching operation in which the movement instructions are generated.

22 Claims, 22 Drawing Sheets

(56) References Cited

U.S. PATENT DOCUMENTS

2019/0337148 A1* 11/2019 Henriksson ............ B25J 13/088
2021/0001484 A1* 1/2021 Bogart ....................... B25J 9/08

OTHER PUBLICATIONS

Aldridge, "VUDU™, the simplest way to program an industrial robot", Jul. 9, 2018, URL: https://www.youtube.com/watch?time_continue=1&v=EHWM9Fu3-ow [Retrieved on Sep. 5, 2018].

* cited by examiner

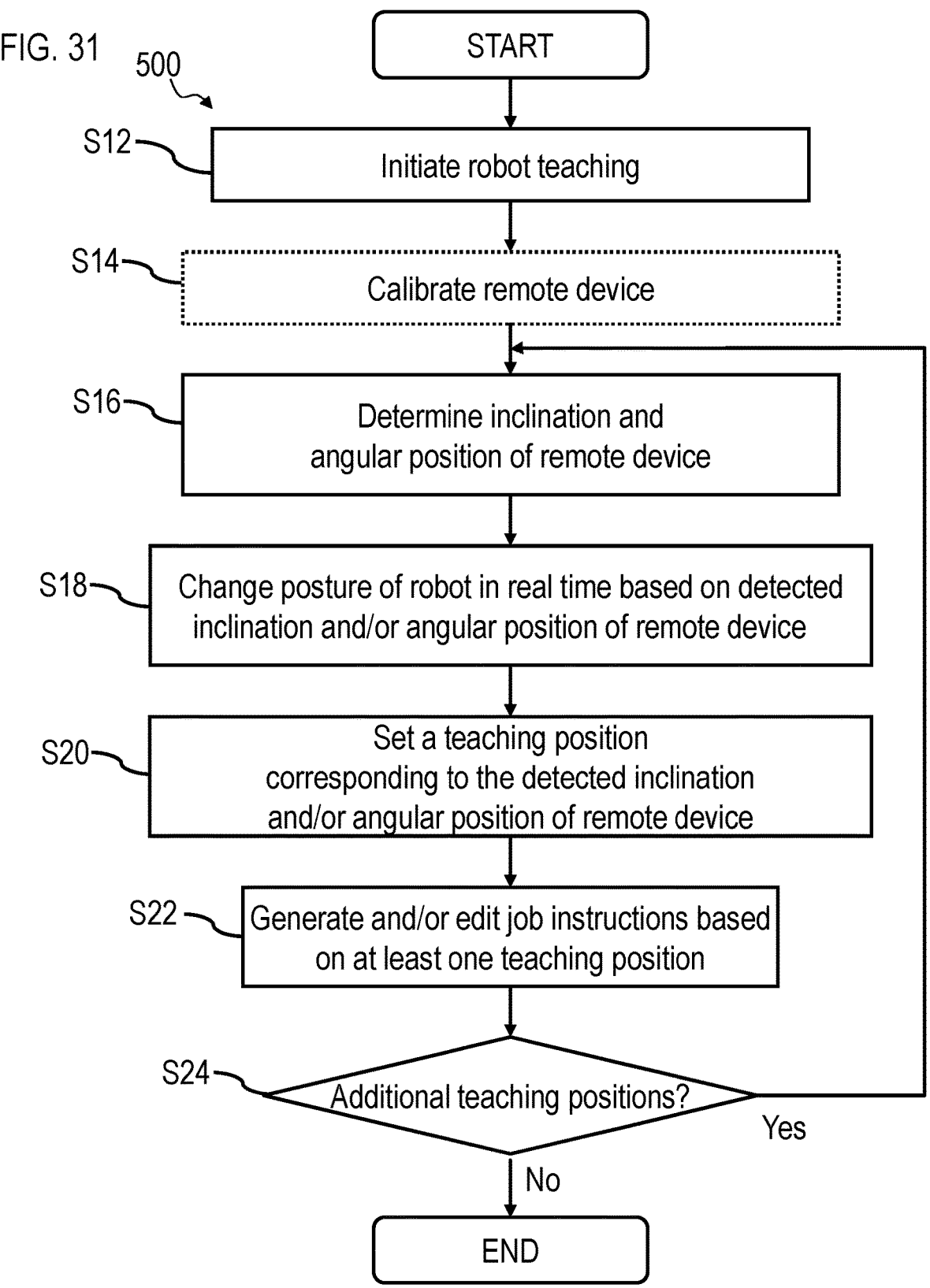

ROBOT INSTRUCTING APPARATUS, TEACHING PENDANT, AND METHOD OF INSTRUCTING A ROBOT

BACKGROUND OF THE INVENTION

Field of the Invention

The present invention relates to robot instruction devices that allow a robot to move and perform tasks in a desired manner.

Discussion of the Background

Robots have been utilized in manufacturing and other applications in which automation is beneficial. In recent years, robots have been designed for increasingly diverse applications including picking, assembly, and sorting. One aspect of robotic automation that is of particular interest is the provision of commands for controlling one or more robots to operate in a desired manner according to a particular application or task.

SUMMARY OF THE INVENTION

The present invention advantageously provides a robot instructing apparatus. The robot instructing apparatus comprises a teaching pendant having a display. An inclination device is configured to output an inclination of a teaching pendant based on the inclination of the teaching pendant about at least one horizontal axis. At least one processor is configured to generate movement instructions to change a posture of the robot based on the inclination of the remote device output by the inclination device during a teaching operation in which the movement instructions are generated.

The present invention advantageously provides a teaching pendant. The teaching pendant comprises a display, an inclination sensor configured to output an inclination of the teaching pendant with respect to at least one horizontal axis, and circuitry configured to generate movement instructions based on the inclination of the teaching pendant output by the inclination sensor. The circuitry is configured to output the movement instructions to change a posture of the robot during a teaching operation based on the inclination of the teaching pendant output by the inclination sensor.

The present invention advantageously provides a method of instructing a robot. The method comprises determining an inclination of a teaching pendant with respect to at least one horizontal axis by an inclination sensor, the teaching pendant having a display configured to cause the teaching pendant to enter a teaching operation based on an interaction with the display. The method also comprises determining an orientation of the teaching pendant about a vertical axis with an orientation sensor, and generating movement instructions to change a posture of the robot based on the determined inclination of the teaching pendant and the determined orientation of the teaching pendant.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 31 is a flowchart illustrating a process for instructing a robot according to an embodiment of the present invention.

DETAILED DESCRIPTION OF EXEMPLARY EMBODIMENTS OF THE INVENTION

Figure 1:
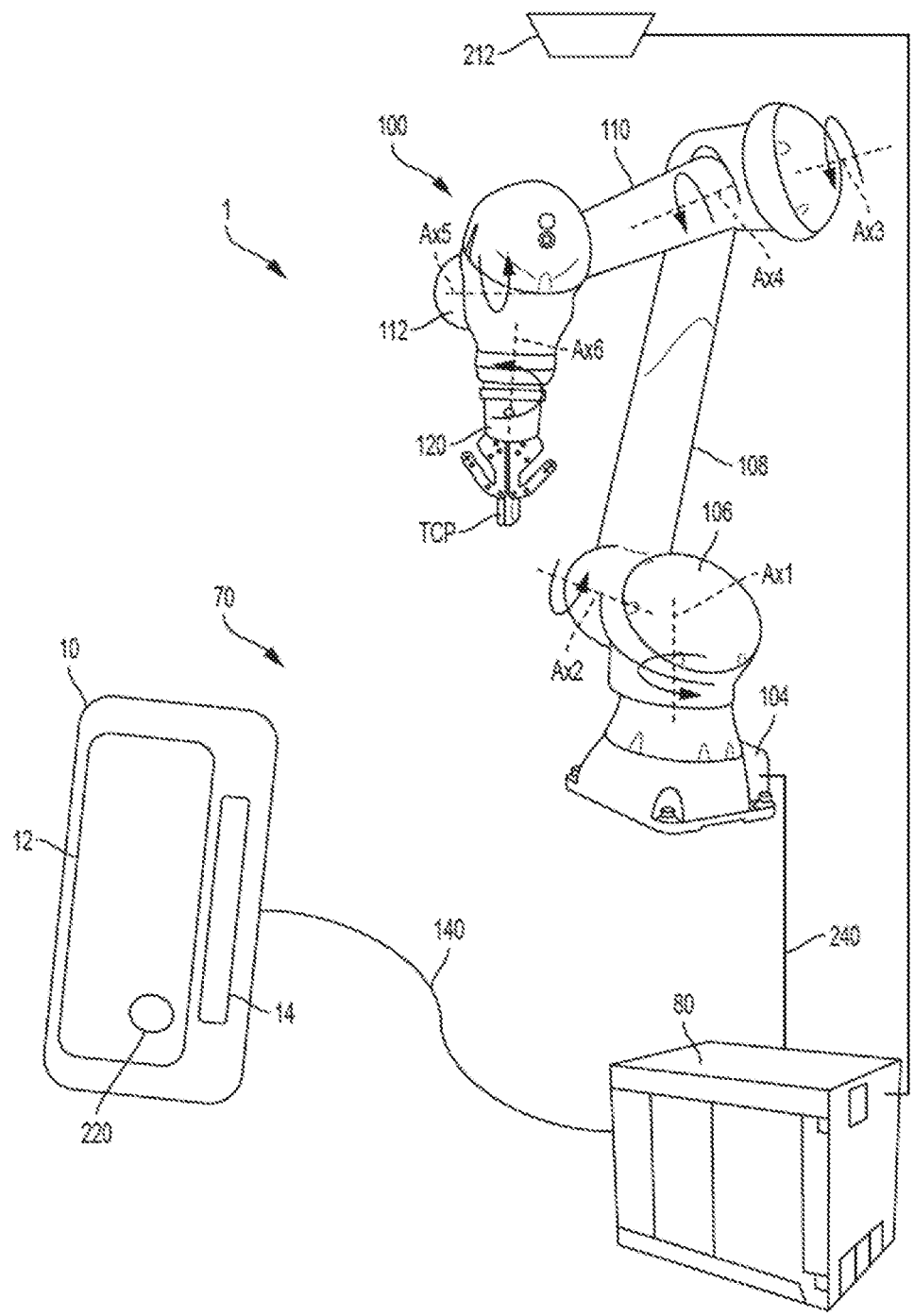
FIG. 1 is a perspective partially schematic perspective view of a system and apparatus for instructing a robot according to an embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

FIG. 1 provides a perspective view of a teaching pendant 10, robot controller 80, and robot 100 that together form a system 1 for instructing (controlling) the robot 100. System 1 includes a robot instructing apparatus 70 that includes a teaching pendant 10 and a robot controller 80. Teaching pendant 10 is an example of a remote device and is used to modify a posture of robot 100 during a teaching operation of the robot 100. As can be seen in FIG. 1, teaching pendant 10 includes a screen (display) 12. Screen 12 provides visual feedback to a user of teaching pendant 10 during the process of issuing commands or teaching a robot 100. Screen 12 can be a touch screen, allowing for a variety of inputs by a user in conjunction with information displayed on screen 12. Advantageously, screen 12 provides a graphical user interface (GUI). An exemplary virtual button 220 of screen 12 is depressed during an inclination teaching mode, as discussed in detail below. Screen 12 can also provide a three-dimensional virtual representation of robot 100 (see virtual robot 310 FIGS. 26a and 26b). An input device 14 provides an interface by which the user can further interact with teaching pendant 10. Input device 14 can be formed by one or more rows of hardware buttons, for example. Alternatively, input device 14 can be formed by one or more rows of buttons that are displayed on a second screen formed by a touch screen adjacent to screen 12. Input device 14 can also provide a graphical user interface, allowing the displayed buttons to receive an input from a user and change if necessary.

Teaching pendant 10 can be connected to a robot controller 80 via a wired or wireless communication medium 140. As depicted in FIG. 1, communication medium 140 can be formed by a wire that extends from teaching pendant 10 to robot controller 80 to allow the teaching pendant 10 and robot controller to communicate with each other. Communication medium 140 can also provide power to the teaching pendant 10. When teaching pendant 10 communicates wireless to robot controller 80, communication medium 140 can be formed by wireless transmissions between a communication interface 40 of teaching pendant 10 and a corresponding communication interface of robot controller 80, as described below.

Robot controller 80 is a device that issues commands (instructions) to bring robot 100 into motion in a desired manner. These commands are input to robot 100 via a second communication medium 240 that connects robot controller 80 to robot 100 or to an intermediate amplifier or control device between robot 100 and robot controller 80. When in communication with teaching pendant 10, robot controller 80 allows for real-time manipulation of robot 100. This real-time manipulation can be used to generate and store a series of teaching points to cause the robot 100 to perform a task or job taught to the robot 100 during the teaching process. Thus, but moving the robot 100 through a series of sequential postures via teaching pendant 10 and robot controller 80, it is possible to program robot 100 to perform a particular task or job in a highly repeatable manner.

An exemplary robot 100 is a multi-axis robot having a base or pedestal 104. A shoulder 106 is rotatably attached to base 104 via a joint in a manner that allows shoulder 106 to rotate about a substantially vertical axis Ax1. A first arm member 108 extends from shoulder 106 via a joint that allows first arm member 108 to rotate about a substantially horizontal axis Ax2. An end of first arm member 108 is connected to second arm member 110 via a joint. Second arm member 110 is rotatable about a substantially horizontal axis Ax3. Furthermore, second arm member 110 is rotatable about an axis Ax4 (longitudinal axis) that extends along the length of arm member 110 towards wrist 112. Wrist 112 is connected to an end of second arm member 110 via a joint and is rotatable about an axis Ax5 that is substantially orthogonal to the longitudinal axis of second arm member 110.

An end effector 120 is connected to an end of wrist 112. The end effector 120 can be, for example, a grasping device, as illustrated in FIG. 1. Of course, any type of end effector 120 that is desired can be employed. For example, end effector 120 can be a suction device, a welding device, a drilling device, an extendable and retractable manipulator, etc. End effector 120 is rotatable about a movable axis Ax6. End effector 120 defines a tool center point TCP, which is located at a tip end of end effector 120, for example. While single-headed arrows are present in FIG. 1 to display motion about each of the axes Ax1-Ax6, robot 100 is capable of rotational motion in both directions relative to each of the axes Ax1-Ax6.

In order to bring the robot 100 into motion, respective drive units are disposed within pedestal 104, shoulder 106, first arm member 108, and second arm member 110. One or more additional drive members can be provided in wrist 112 or within end effector 120 for the rotation and operation of end effector 120. Each of the drive units is controlled by commands issued by robot controller 80. If necessary, one or more intermediate control devices can be employed between robot controller 80 and one or more of the drive units of robot 100. Furthermore, robot 100 can be provided with any number of degrees of freedom, provided at least one of freedom is present.

Teaching pendant 10 is a device that provides an intuitive interface for a user to generate instructions for one or more robots, such as robot 100. By interacting with screen 12 and input device 14, a user can readily move robot 100 to a particular posture. Once robot 100 is brought into a desired posture, this posture can be set as a teaching point. Thus, by teaching a series of postures to robot 100, an operation of the robot 100 can be precisely controlled. A particular posture of robot 100 includes the position of each movable component, shoulder 106, first arm member 108, second arm member 110, wrist 112, and end effector 120.

System 1 can include a camera or visual sensor 212 which is able to determine a position of teaching pendant 10. Visual sensor 212 is particularly useful in achieving accuracy when a position of teaching pendant 10 is used to change a posture of the robot or a position of tool center point TCP during a translation teaching mode described in detail below.

Figure 2:
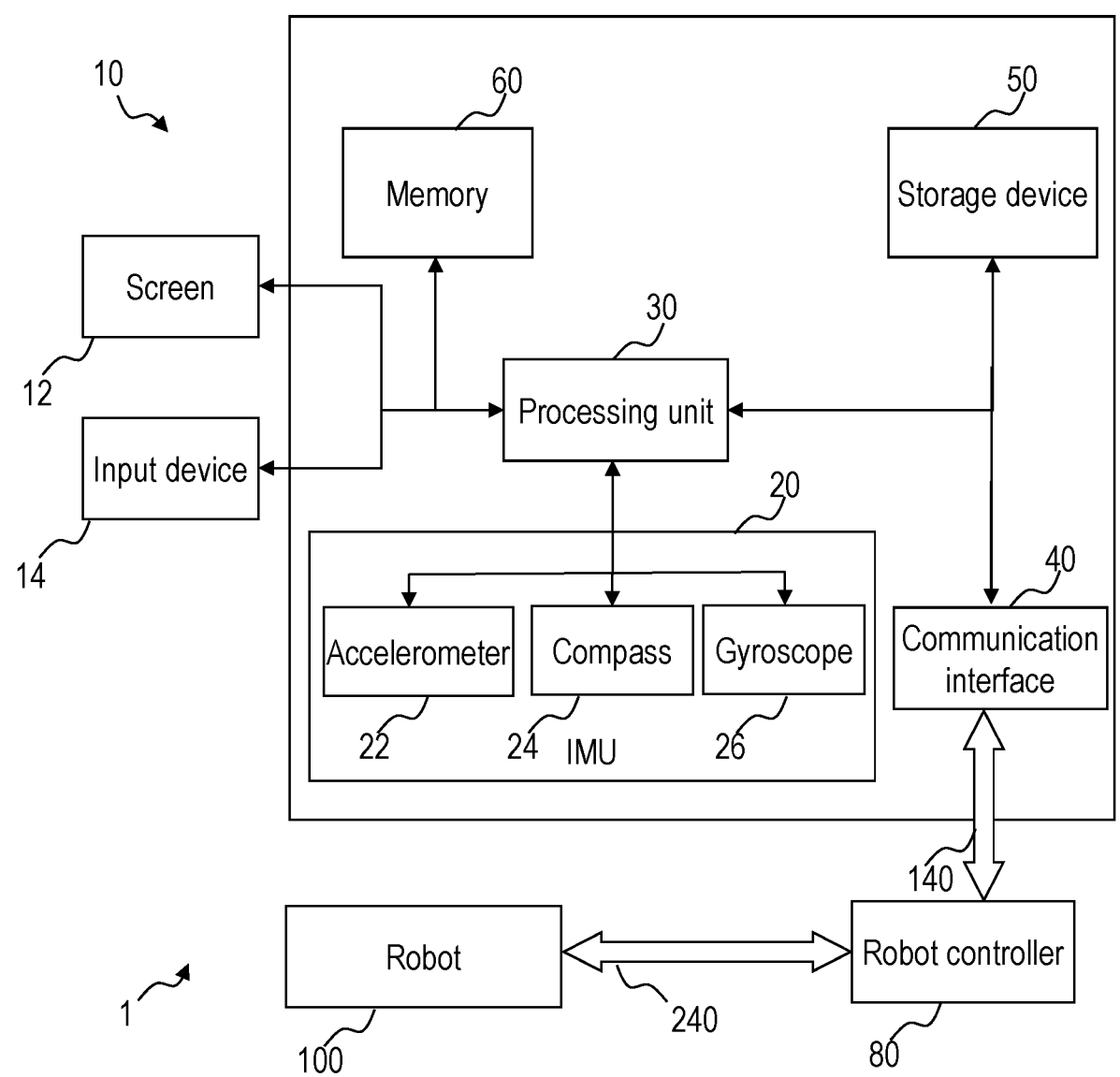
FIG. 2 is a block diagram of a hardware configuration of a system and apparatus for instructing a robot according to another embodiment of the present invention.

FIG. 2 illustrates the relationship between the hardware of teaching pendant 10, the robot controller 80 and robot 100 of system 1. As depicted in FIG. 2, screen 12 and input device 14 are formed on an exterior of teaching pendant 10. A processing unit 30 that includes one or more processors (e.g. microprocessors) receives and processes input from at least the input device 14. Each processor of processing unit 30 can include one or more multi-core processors. When screen 12 is a touch screen, processing unit 30 receives and processes the input from the screen 12. Processing unit 30 also performs processing to display a particular image on screen 12 to facilitate a user's interaction with teaching pendant 10. An inertial measurement unit (IMU) 20 includes an accelerometer 22, a compass sensor 24, and a gyroscope 26. Accelerometer 22 is an example of an inclination sensor or inclination device. Specifically, accelerometer 22 is a sensor that senses an acceleration. An output of accelerometer 22 is indicative of an inclination of teaching pendant 10. Compass sensor 24 is an example of an orientation sensor or orientation device. Compass sensor 24 is a geomagnetic sensor that provides an output corresponding to a heading of teaching pendant 10 about a vertical axis. Gyroscope 26 is also an example of an orientation sensor or orientation device that provides an output indicative of an angular position of teaching pendant 10 as teaching pendant 10 is rotated about a vertical axis. If desired, compass sensor 24 can be employed alone, without the inclusion of gyroscope 26. Accelerometer 22, compass sensor 24, and gyroscope 26 are hardware components of IMU 20, which is also a hardware component. IMU 20 outputs positioning signals to processing unit 30. Preferably, IMU 20 outputs signals to processing unit 30 that are representative of an orientation of teaching pendant 10 with respect to nine axes. If desired, accelerometer 22, compass sensor 24, and gyroscope 26 can be provided separately without IMU 20. Thus, IMU 20 is an example of both an inclination device and an orientation device. Similarly, IMU 20 therefore includes an inclination sensor and an orientation sensor. Advantageously, processing unit 30 is programmed to include data from three sensors, the accelerometer 22, compass sensor 24, and gyroscope 26, to calculate an orientation matrix. From the orientation matrix, the inclination of teaching pendant 10 as well as the orientation of teaching pendant 10 can be determined.

Storage device 50 is a long term storage, such as a read only memory (ROM), hard disk drive, solid state drive, universal serial bus (USB), storage device, or other computer readable medium that stores a program. The program stored by storage device 50 contains instructions that allow processing unit 30 to process the output of the accelerometer 22 of inertial measurement unit 20 and thereby determine the inclination of teaching pendant 10 about at least one vertical axis. The program stored by storage device 50 also contains instructions that allow processing unit 30 to process the output of compass sensor 24 and gyroscope 26 of inertial measurement unit 20 and thereby determine the orientation of teaching pendant 10. This orientation corresponds to a rotational position of teaching pendant 10 about a vertical direction (e.g. vertical axis Z). Thus, processing unit 30 is configured to determine the inclination and angular position of teaching pendant 10 for performing the instructing process described below. While remote device 10 has an IMU 20 that interfaces with communication interface 40 via a processing unit 30, IMU 20 can provide an output directly to communication interface 40.

The one or more processors of processing unit 30 form circuitry that is configured to generate movement instructions as described in detail herein. Furthermore, the one or more processors of processing unit 30 form circuitry that is configured to output the movement instructions and, based on the output from accelerometer 22, compass sensor 24, and gyroscope 26, perform each of the functions described herein for changing the posture of robot 100, including the generation and storage of job instructions.

Communication interface 40 is also provided to teaching pendant 10. Communication interface 40 is, for example, an output port that allows for at least wired or wireless communication between teaching pendant 10 and robot controller 80. As illustrated in FIG. 1, when communication interface 40 provides wired communication, a port of communication interface 40 receives a physical communication medium, or cable, 140. In the example of FIG. 1, communication medium (e.g. cable) 140 extends from a port of communication interface 40 of teaching pendant 10 to a corresponding port of a separate communication interface of robot controller 80. When communication interface 40 is formed by a wireless interface, a radio transmitter/receiver pair in communication interface 40 communicates with a corresponding radio transmitter/receiver pair in robot controller 80. Wireless communication can be performed via the 802.11x standard (e.g. 802.11n, 802.11g, 802.11b, etc.) for example. Of course, other wireless standards can be employed to provide wireless communication between teaching pendant 10 and robot controller 80. In order to provide the greatest level of flexibility for a user, a communication interface 40 that supports both wired and wireless communication can be included in teaching pendant 10.

In addition to the inertial measurement unit 20, processing unit 30, communication interface 40 a short-term or random access memory 60 can be provided to teaching pendant 10. Memory 60 provides high speed access to information necessary to perform the instructing process described below.

Figure 3:
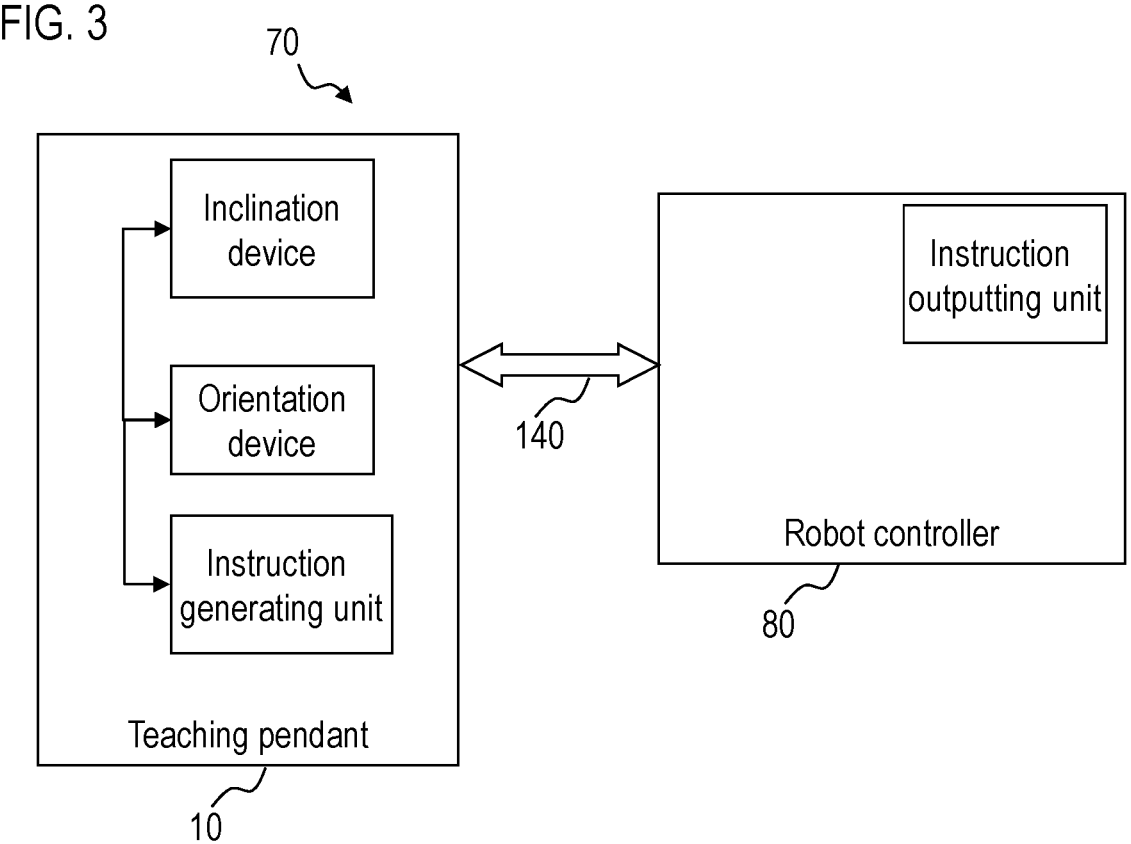
FIG. 3 is a block diagram illustrating a configuration of a teaching pendant and robot controller according to an embodiment of the present invention.

FIG. 3 is a block diagram representing the relationship between the hardware components of a teaching pendant 10 and the robot controller 80 of robot instructing apparatus 70. The teaching pendant 10 includes an inclination device that determines an inclination of the teaching pendant 10, an orientation device that determines an orientation (angular position) of teaching pendant 10, and an instruction generating unit that is configured to generate instructions for instructing robot 100 based on the output of at least one of the inclination device and the orientation device. Processing unit 30 generates instructions for robot controller 80. The instructions generated by the instruction generating unit in teaching pendant 10 are transmitted via communication medium 140 to robot controller 80. The robot controller 80 includes an instruction outputting unit formed by one or more output devices having an output port to output instructions via second communication medium 240 to change the posture of robot 100. Robot controller 80 is configured to further develop and modify, if necessary, the instructions received from the instruction generating unit of teaching pendant 10, reducing the processing load placed on processing unit 30 of teaching pendant 10. Thus, robot controller 80 can assist in the generation of instructions. Alternatively, teaching pendant 10 can include all of the functions of robot controller 80, and can be in direct communication with robot 100.

Figure 4:
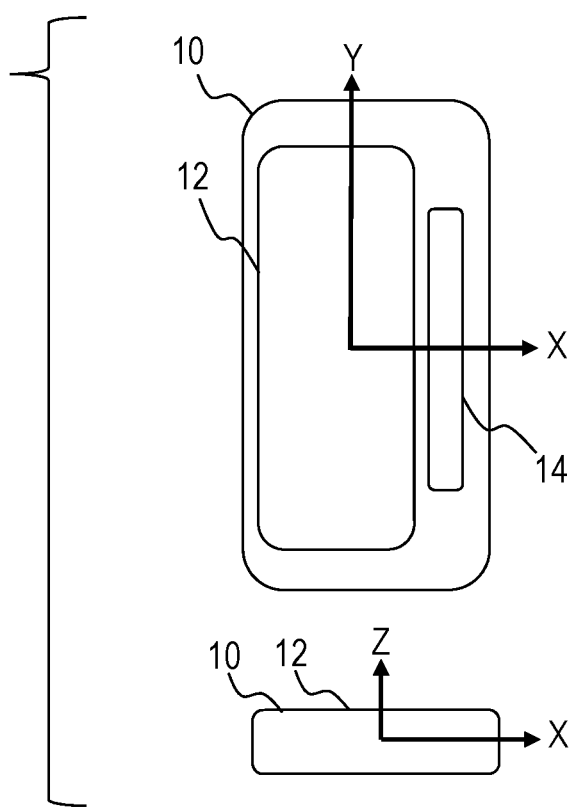
FIG. 4 is a schematic top view and a schematic front view of a teaching pendant illustrating exemplary inclination axes during a calibration according to an embodiment of the present invention.

FIG. 4 illustrates a technique for determining an inclination of teaching pendant 10 in conjunction with accelerometer 22. FIG. 4 provides a top view (upper portion of FIG. 4) and a front view (lower portion of FIG. 4) of teaching pendant 10. Thus, FIG. 4 illustrates teaching pendant 10 in a state in which screen 12 extends in a substantially horizontal direction. As depicted in FIG. 4, teaching pendant 10 is inclinable about two orthogonal inclination axes X and Y. In the example depicted in FIG. 4, inclination axis X corresponds to a width direction of teaching pendant 10, while inclination axis Y corresponds to a longitudinal or length direction. Thus, left and right sides of teaching pendant 10 are opposed along a direction along inclination axis X, while front and rear sides of teaching pendant 10 are opposed along a direction along inclination axis Y. The lower portion of FIG. 4 illustrates a vertical axis Z, which corresponds to a depth or height direction of teaching pendant 10. An angular position of teaching pendant 10 is determined with respect to vertical axis Z.

By tilting a left side of teaching pendant 10 upward or downward for example, the pendant is rotated about axis Y and is inclined with respect to axis X. This movement brings the left side of teaching pendant 10 closer or farther from vertical axis Z. By tilting a front side of teaching pendant upward or downward, teaching pendant 10 is inclined with respect to inclination axis Y while the teaching pendant 10 is rotated about axis X. This movement brings the front of the teaching pendant 10 closer or farther from vertical axis Z. In this manner, each possible inclination of teaching pendant 10 can be determined by processing unit in conjunction with three-axis accelerometers that measure acceleration along each of the axes X, Y, and Z.

Figure 5:
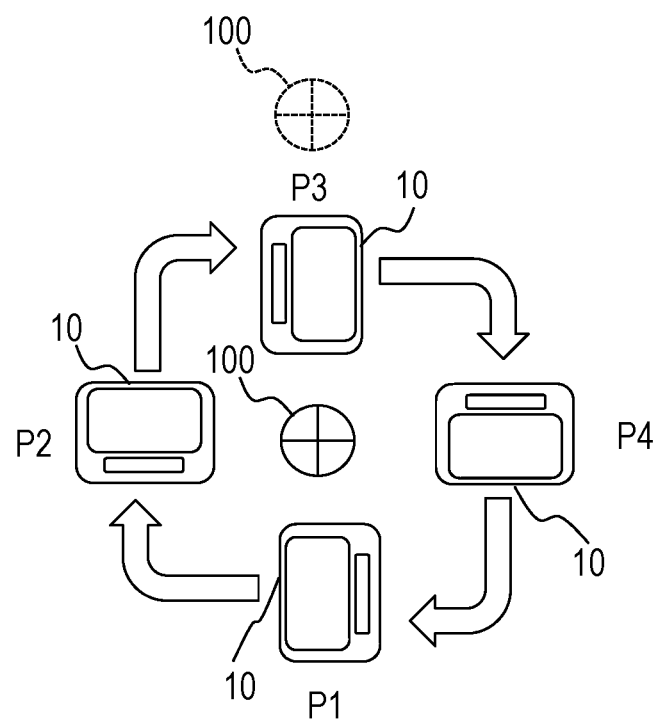
FIG. 5 is a schematic view illustrating exemplary angular positions of a teaching pendant according to an embodiment of the present invention.

FIG. 5 illustrates a process for determining an angular position of teaching pendant 10 in conjunction with compass sensor 24 and gyroscope 26. FIG. 5 illustrates a series of differing angular positions P1-P4 of teaching pendant 10 with respect to robot 100. At the first position P1 depicted in FIG. 5, teaching pendant 10 is located directly in front of robot 100 such that a front of teaching pendant 10 faces a front of robotic apparatus 100. Proceeding clockwise, a second position P2 is located on the left side of FIG. 5. In this second position P2, the teaching pendant 10 has been angularly rotated 90 degrees so that the front of teaching pendant 10 faces a first (left) side of robot 100. A third position P3 is located behind robot 10 at an upper portion of FIG. 5 such that a front of teaching pendant 10 faces the rear of robot 100. Finally, a fourth position P4 on the right side of FIG. 5 illustrates a position in which the front of teaching pendant 10 faces a second (right) side of robot 100 that is opposite to the first side of the robot. Compass sensor 24 measures and outputs a signal corresponding to the angular position of teaching pendant 10, thus allowing teaching pendant 10 and processing unit 30 to determine the angular position of teaching pendant 10 for any angular position, including intermediate positions between any of the positions P1-P4.

While teaching pendant 10 can determine various angular positions of teaching pendant 10 when teaching pendant is moved about a series of positions P1-P4 that surround robot 100, it is also possible to perform the same determination at various angular positions that do not surround robot 100. For example, when robot 100 is located at a position substantially in front of teaching pendant 10, as illustrated in dashed lines in FIG. 5, the angular process determination performed by processing unit 30 and teaching pendant 10 based on the output of compass sensor 24 (and, if desired, gyroscope 26) is the same as described above. Furthermore, an angular position of teaching pendant 10 can be changed by rotating the pendant with respect to robot 100, but without moving the teaching pendant from a particular position. For example, teaching pendant 10 can be rotated about vertical axis Z while remaining at first position P1. During this rotation, compass sensor 24 outputs the corresponding change in angular position, even though the teaching pendant 10 remains at first position P1. This significantly improves the versatility of the angular position determination.

During a calibration process, teaching pendant 10 can be placed in a desired "zero" position. For example, teaching pendant 10 can be placed in a position that is essentially flat, such that there is no significant inclination, as depicted in FIG. 4. Similarly, the calibration process can include setting a particular angular position that is considered a "zero" position. As depicted in the lower position of FIG. 5, such a position may place the front of the teaching pendant 10 in a location that faces the front of robot 100. However, any desirable position can be used to calibrate teaching pendant 10 and establish a desired "zero" position (see FIGS. 26a and 26b, for example). Furthermore, the calibration process can be repeated if the results are unsatisfactory or if conditions change.

Advantageously, the need to perform a calibration process can be avoided by providing an additional compass sensor in robot 100. An additional compass sensor can be provided in base 104 of robot 100, for example. When an additional compass sensor is provided in robot 100, processing unit 30 can determine the orientation of the teaching pendant 10 with respect to robot 100, avoiding the need to establish a desired "zero" position by interaction with a user.

A detailed explanation of a procedure for creating job instructions for robot 100 using teaching pendant 10 will now be described. A teaching operation for creating job instructions can be performed following a calibration process according to the description above. A teaching operation can provide a plurality of modes during which various aspects of robot 100 can be modified. For example, a teaching operation can include an inclination teaching mode and a translation teaching mode. Preferably, teaching pendant 10 allows a user to enter a teaching operation by a first interaction with a graphical user interface (GUI) provided by screen 12 and/or user interface 14. Once the teaching pendant 10 has entered the teaching operation, an inclination teaching mode, rotation teaching mode, and translation teaching mode are readily employed by performing an interaction with screen 12 and/or user interface 14. Preferably, for at least the rotation teaching mode, this second interaction involves continually pressing a physical button or virtual button 220 on screen 12 or user interface 14. When the teaching pendant 10 no longer detects that the button 220 is depressed, the inclination teaching mode can be exited. Requiring a continual input during an inclination teaching mode advantageously increases the safety of the teaching operation. In the following description, it will be assumed that button 220 for entering the inclination mode is continually depressed for each inclination of the teaching pendant 10 discussed with respect to the inclination teaching mode.

Figure 6:
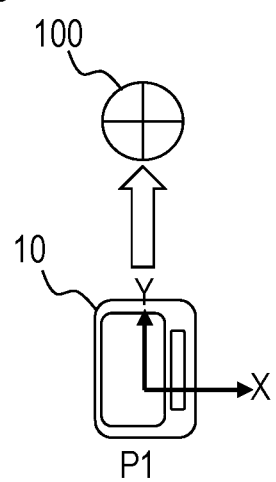
FIG. 6 is a schematic top view illustrating an angular position of a teaching pendant according to an embodiment of the present invention.
Figure 7:
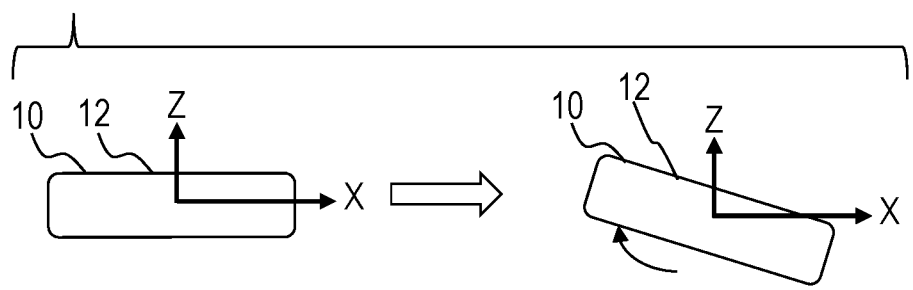
FIG. 7 is a schematic front view illustrating an inclination of a teaching pendant during an inclination teaching mode according to an embodiment of the present invention.

During the inclination teaching mode, teaching pendant 10 is able to set various postures and thereby arrive at a series of desired teaching points for robot 100 based on the inclination and angular position of the teaching pendant 10. During the inclination teaching mode, robot 100 is re-oriented, or inclined, with respect to tool center point TCP. As illustrated in FIG. 6, the teaching pendant can be disposed in first position P1 such that a front position of teaching pendant 10 faces a front of robot 100. FIG. 7 illustrates a change in inclination in which a left side of teaching pendant 10 is lifted. The left portion of FIG. 7 illustrates an initial position in which teaching pendant 10 is substantially flat (no inclination). Thereafter, teaching pendant 10 is rotated about axis Y. This movement brings the left side of the pendant closer to the vertical axis Z as depicted in the right portion of FIG. 7.

Figure 8A:
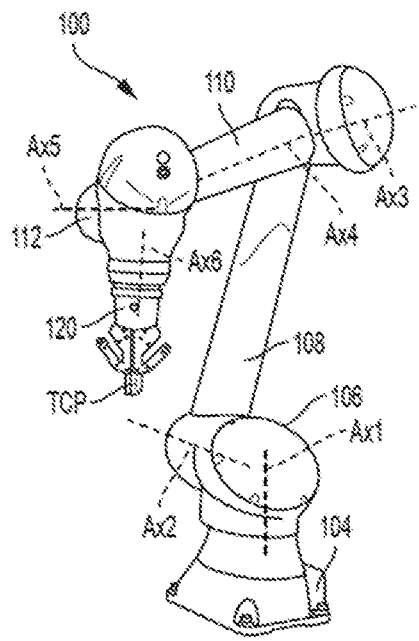
FIGS. 8a-8c are perspective views illustrating a series of postures of a robot during an inclination teaching mode according to an embodiment of the present invention.
Figure 8B:
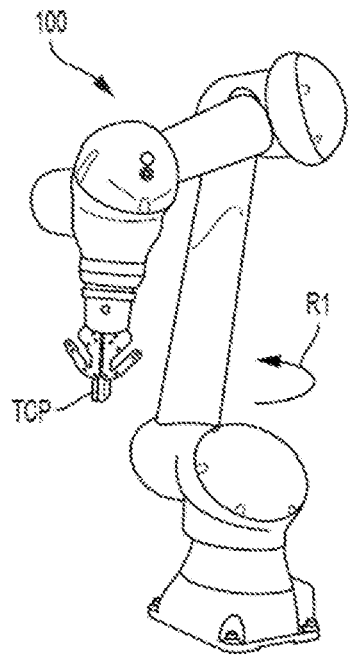
Figure 8C:
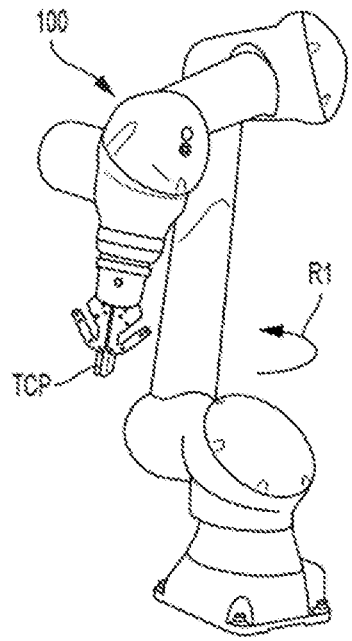

FIGS. 8a-8c are perspective views illustrating a change in the posture of robot 100 that occurs in response to real-time instructions (movement instructions) generated based on the inclination of teaching pendant 10 depicted in FIG. 7 when located at position P1. When teaching pendant 10 is inclined in the manner depicted in FIG. 7 while button 220 is depressed, teaching pendant 10 and robot controller 80 continually change the posture of robot 100 such that the posture of the robot begins at the position in FIG. 8a and gradually rotates based on the inclination direction of teaching pendant 10 relative to inclination axis X (an inclination about axis Y). In this example, the change in posture of the robot 100 is generally counter-clockwise about a vertical axis from the perspective of FIGS. 8a-8c, as indicated by the direction R1. This change in posture, for example, causes a rotation of shoulder 106, first arm member 108, second arm member 110, wrist 112 and end effector 120, as necessary, to change the posture of the robot 100. For of ease of illustration, labels for shoulder 106, first arm member 108, second arm member 110, wrist 112 and end effector 120 and the associated axes are omitted from FIGS. 8b, 8c, 11 *a*-11*c*, 14*a*-14*c*, 17*a*, 17*b*, 21*a*, 21*b*, and 25*a*-25*c*.

Preferably, the tool center point TCP is maintained at a single position in three dimensions in X-Y-Z space during the rotation of the components of robot 100. Thus, tool center point TCP is held at a single position with respect to an X-axis, a Y-axis, and a Z-axis. This allows an intuitive and improved method of altering the posture of robot 100. A speed of the change in posture of robot 100 can be changed by interacting with display 12. For example, display 12 can include a slider with various speeds (see speed selector 230 of FIG. 28), each of the speeds of the slider specifying a particular ratio between the movement of the teaching pendant 10 and the corresponding movement of the robot 100. Thus, when robot 100 changes posture with a constant speed based on the inclination of teaching pendant 10, this constant speed can be set according to a preference of a user. Also, a speed of the change in posture of robot 100 can be increased in accordance with a larger inclination. No joystick, lever, or trigger is necessary to change the posture of robot 100 during this inclination teaching mode.

During the change of posture of robot 100 based on the inclination of teaching pendant 10, the robot 100 begins in the position depicted in FIG. 8a. Gradually, each of the movable links of robot 100, shoulder 106, first arm member 108, second arm member 110, wrist 112 and end effector 120, are driven to the intermediate position depicted in FIG. 8b. This change in posture of robot 100 is generally a counter-clockwise rotation about a vertical axis, as indicated by direction R1 in FIGS. 8b and 8c. As illustrated in FIGS. 8a and 8b, the tool center point TCP is advantageously held constant at a single position in three dimensions during this change in posture. If teaching pendant 10 continues to be inclined as depicted in FIG. 7 and remains at the angular position P1 depicted in FIG. 6, the posture of robot 100 proceeds from the intermediate posture of FIG. 8b to a desired final posture depicted in FIG. 8c. The change in posture stops immediately and in real-time when the teaching pendant returns to the non-inclined position depicted in the left of FIG. 7. Also, the change in posture stops immediately when a virtual button or physical button for entering and maintaining the inclination teaching mode is no longer depressed.

Figure 9A:
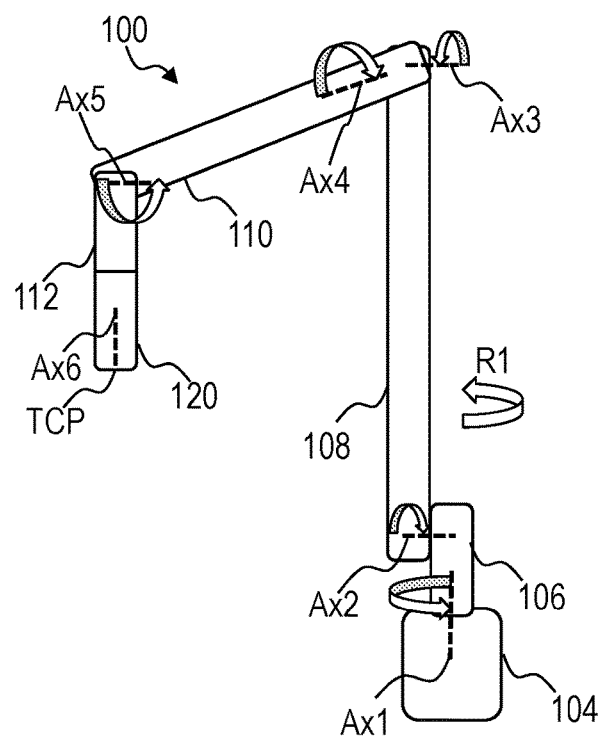
FIGS. 9a and 9b are schematic front views illustrating a series of postures of a robot during an inclination teaching mode according to an embodiment of the present invention.
Figure 9B:
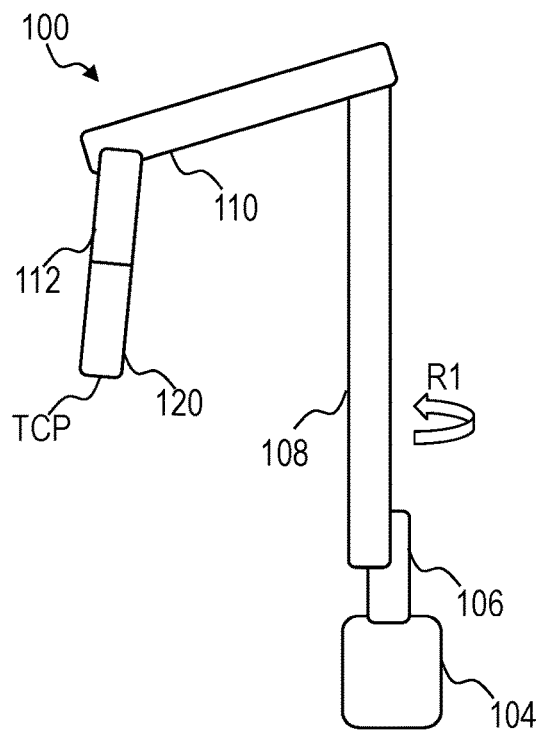

FIGS. 9a and 9b are schematic front views of robot 100 illustrating a change in posture of the robot 100 corresponding to the inclination of teaching pendant 10 illustrated in FIG. 6 in combination with the angular position of teaching pendant 10 illustrated in FIG. 7. As noted above, the change in posture of the robot 100 is generally counter-clockwise about a vertical axis from the perspective of FIGS. 8a-8c, as indicated by the direction R1. A movement of each movable link of robot 100 to achieve the generally counter-clockwise motion in direction R1 of FIGS. 8a-8c will now be described with reference to FIGS. 9a and 9b.

As illustrated in FIG. 9a, this change in posture can include a rotation of shoulder 106 about vertical axis Ax1 in a counter-clockwise direction from a front view of robot 100. This rotation brings first arm member 108 in a position closer to the front of robot 100 as viewed in FIG. 9b. The first arm member 108, second arm member 110, and wrist 112 can be driven in order to maintain tool center point TCP at a constant location in three dimensions throughout the change in posture of robot 100. Second arm member is rotated in a clockwise manner about longitudinal axis Ax4, while wrist 112 is rotated about axis Ax5 to slightly raise wrist 112 and end effector 120. The motion of second arm member 110 and wrist 112 with respect to axes Ax4 and Ax5 assist in modifying a position of end effector 120 in a manner that changes the angle of end effector 120 while holding tool center point TCP in the same location in three dimensions. Also, first arm member 108 is rotated slightly about horizontal axis Ax2 towards a front of robot 100, while second arm member 110 is raised slightly about horizontal axis Ax3 if necessary to hold the position of tool center point TCP at the single location in three dimensions.

Figure 10:
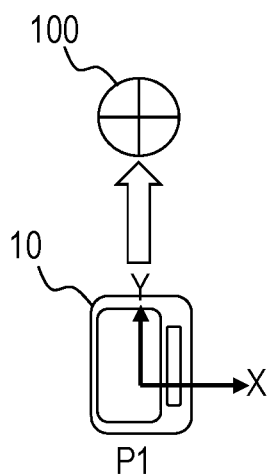
FIG. 10 is a schematic top view illustrating an angular position of a teaching pendant according to an embodiment of the present invention.
Figure 11:
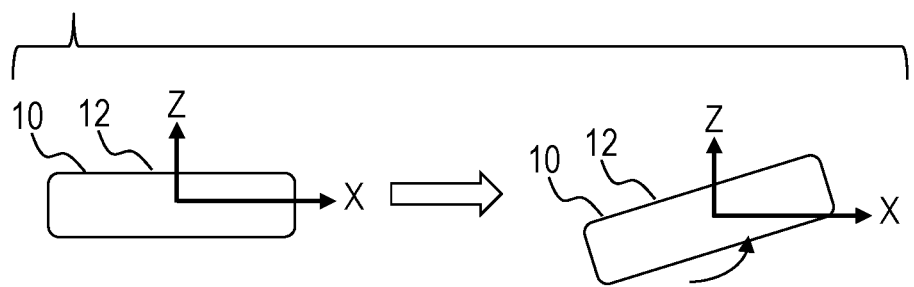
FIG. 11 is a schematic front view illustrating an inclination of a teaching pendant during an inclination teaching mode according to an embodiment of the present invention.

An opposite inclination of teaching pendant 10 will now be described. As depicted in FIG. 10, teaching pendant can continue to be disposed in first position P1 such that a front of teaching pendant 10 faces a front of robot 100. FIG. 11 illustrates a change in inclination in which a right side of teaching pendant 10 is lifted while at first position P1. The left portion of FIG. 11 illustrates an initial position in which teaching pendant 10 is substantially flat (no inclination relative to the zero position). Thereafter, teaching pendant 10 is rotated about inclination axis Y while button 220 is depressed. This movement brings the right side of the teaching pendant 10 closer to the vertical axis Z as depicted in the right portion of FIG. 11, resulting in an inclination relative to inclination axis X.

Figure 12A:
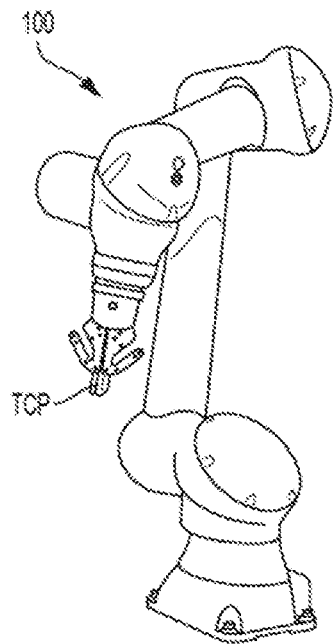
FIGS. 12a-12c are perspective views illustrating a series of postures of a robot during an inclination teaching mode according to an embodiment of the present invention.
Figure 12B:
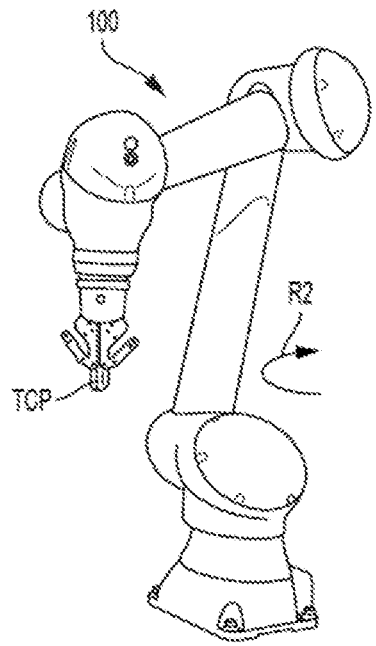
Figure 12C:
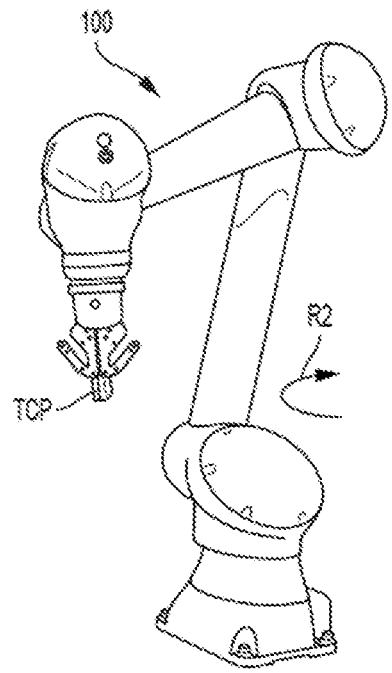

FIGS. 12a-12c are perspective views illustrating a change in posture of robot 100 that occurs in response to real-time instructions generated in accordance with this inclination of teaching pendant 10 while placed at an angular position corresponding to position P1. When teaching pendant 10 is inclined as depicted in FIG. 11, teaching pendant 10 and robot controller 80 continually change the posture of robot 100 such that the posture of the robot begins at the position in FIG. 12a and gradually rotates based on the inclination direction of teaching pendant 10, reaching an intermediate posture of FIG. 12b before proceeding to a final posture depicted in FIG. 12c. In this example, the change in posture of the robot 100 is generally clockwise rotation about a vertical axis, as indicated by the direction R2 in FIGS. 12b and 12c. The change in posture stops immediately in real-time when the teaching pendant returns to the non-inclined position depicted in the left of FIG. 11. As can be seen by comparing FIGS. 12a-12c with FIGS. 8a-8c, due to the opposite inclination of teaching pendant 10, the change in posture in FIGS. 12a-12c is substantially the opposite of the change in posture of FIGS. 8a-8c. Preferably, the tool center point TCP is held constant at a single position in three dimensions during the rotation of the components of robot 100. This allows an intuitive and improved method of altering the posture of robot 100. The change in posture of robot 100 can be performed at a constant speed. Alternatively, the speed of the change of posture of robot 100 can be variable based on an amount of inclination. Furthermore, the speed of the change in posture of robot 100 can be increased by interaction with speed selector 230. Alternatively, the speed of the change of posture of robot 100 can be variable such that the speed changes in real-time based on an amount of inclination. No joystick, lever, or trigger is necessary to change the posture of robot 100 in this manner.

Figure 14:
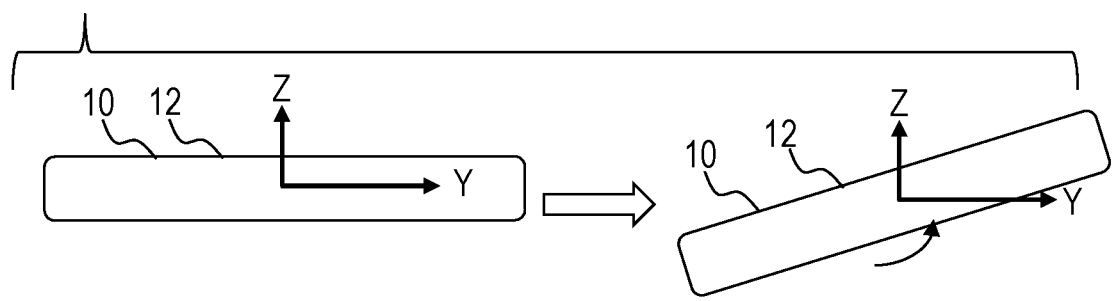
FIG. 14 is a schematic side view illustrating an inclination of a teaching pendant during an inclination teaching mode according to an embodiment of the present invention.

As depicted in FIG. 14, teaching pendant can continue to be disposed in first position P1 such that a front portion of teaching pendant 10 faces a front of robot 100. FIG. 14 illustrates a change in inclination in which a front side of teaching pendant 10 is lifted. The left portion of FIG. 14 illustrates an initial position in which teaching pendant 10 is substantially flat (no inclination). Thereafter, teaching pendant 10 is inclined relative to inclination axis Y while button 220 is depressed. This movement brings the front side of the pendant closer to the vertical axis Z as depicted in the right portion of FIG. 14.

Figure 15A:
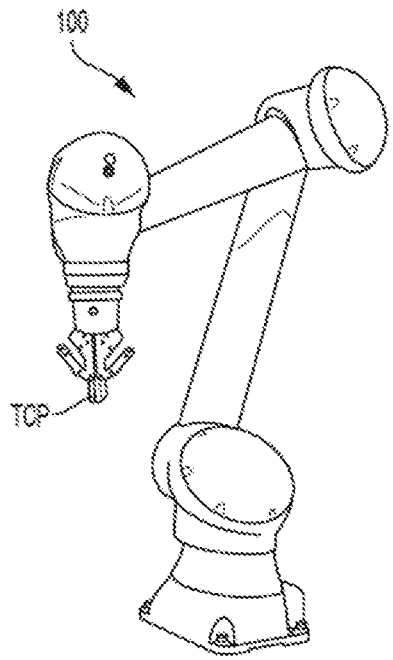
FIGS. 15a-15c are perspective views illustrating a series of postures of a robot during an inclination teaching mode according to an embodiment of the present invention.
Figure 15B:
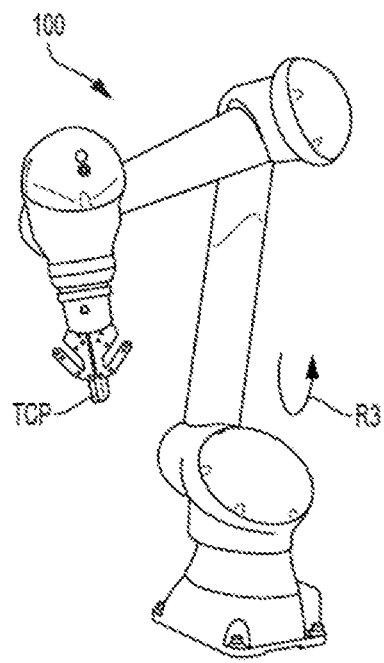
Figure 15C:
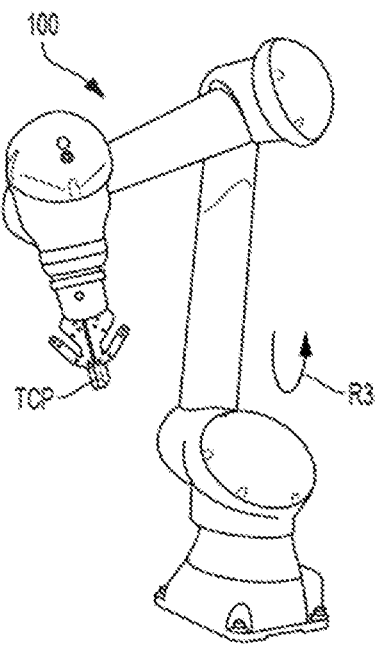

FIGS. 15a-15c are perspective views illustrating a change in posture robot 100 that occurs in response to real-time instructions generated based on this inclination of teaching pendant 10 while teaching pendant 10 is located at an angular position corresponding to position P1. When teaching pendant 10 is inclined as depicted in the right portion of FIG. 14, teaching pendant 10 and robot controller 80 continually change the posture of robot 100 such that the posture of the robot begins at the position in FIG. 15a and gradually rotates so as to generally follow the inclination direction of teaching pendant 10, reaching an intermediate posture of FIG. 15b before proceeding to a final posture depicted in FIG. 15c. In this example, the change in posture of the robot 100 is in a generally clockwise direction with respect to a horizontal axis from the perspective of FIGS. 15a-15c. Direction R3 indicates the direction of the change in posture of robot 100 in this example. The change in posture stops immediately in real time when the teaching pendant returns to the non-inclined position depicted in the left of FIG. 14. Preferably, the tool center point TCP is maintained at a single position in three dimensions during the rotation of the components of robot 100. This allows an intuitive and improved method of altering the posture of robot 100. The change in posture of robot 100 can be performed at a constant speed. Furthermore, the speed of the change in posture of robot 100 can be increased by interaction with speed selector 230. Alternatively, the speed of the change of posture of robot 100 can be variable such that the speed changes in real-time based on an amount of inclination. No joystick, lever, or trigger is necessary to change the posture of robot 100 in this manner.

Figure 23:
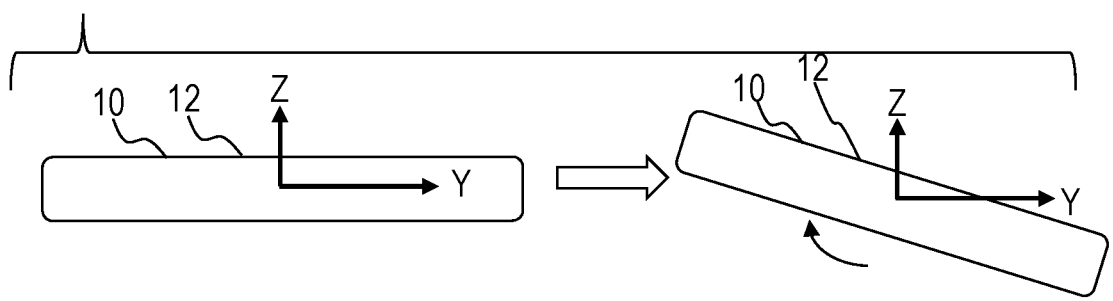
FIG. 23 is a schematic side view illustrating an inclination of a teaching pendant during an inclination teaching mode according to an embodiment of the present invention.

An inclination of teaching pendant 10 opposite to the inclination of FIG. 14 causes a change in posture in a direction opposite to R3. For example, the teaching pendant 10 can be rotated about axis X such that a rear portion of teaching pendant 10 is brought closer to the vertical axis Z, as illustrated in FIG. 23. When teaching pendant 10 is inclined in the manner depicted in FIG. 23 (which is opposite to the rotation illustrated in FIG. 14), the posture of robot 100 changes posture in the manner opposite to the depiction in FIGS. 15a-15c. For example, the posture of robot 100 changes such that the change in posture is in a generally counter-clockwise direction with respect to a horizontal axis from the perspective of FIGS. 15a-15c (see also FIGS. 21a and 21b). Thus, when robot 100 is in an initial posture, as illustrated in FIG. 15c, the posture of robot 100 will proceed to an intermediate position illustrated in FIG. 15b and proceed to the position depicted in FIG. 15a.

As is clear from the foregoing description of FIGS. 6-15c, it is possible to easily change the posture of robot 100 by inclining teaching pendant 10 in various directions. The change in direction generally matches the direction in which the teaching pendant 10 is tilted. This significantly improves the ability of the teaching pendant 10 to be used without the need to view or modify Cartesian coordinate frames with respect to the robot 100, tool center point TCP, or the user. Any of the various postures can be set as a teaching point, or teaching posture, for robot 100, which can be then stored by robot controller 80 or teaching pendant 10 as a stored teaching point. Teaching points can be edited by the user at any time. For example, a list of stored teaching points is displayed on screen 12. By selecting a desired teaching point, a user can change various parameters associated with the teaching point, including acceleration and speed, for example. The order of execution of each teaching point can be modified, and teaching points can be deleted or duplicated as desired. Once at least one teaching point has been stored, robot 100 can be instructed or programmed to autonomously and independently perform a task based on the teaching point(s). Teaching points can be stored by exiting the inclination teaching mode and entering a different mode to set one or more teaching points. For example, teaching points can involve manipulations via end effector 120 that are set by interacting with screen 12 and/or input device 14. Additionally, tool center point TCP or any of the individual movable links of robot 100 can be jogged or moved linearly by a user interacting with teaching pendant 10.

Figure 16:
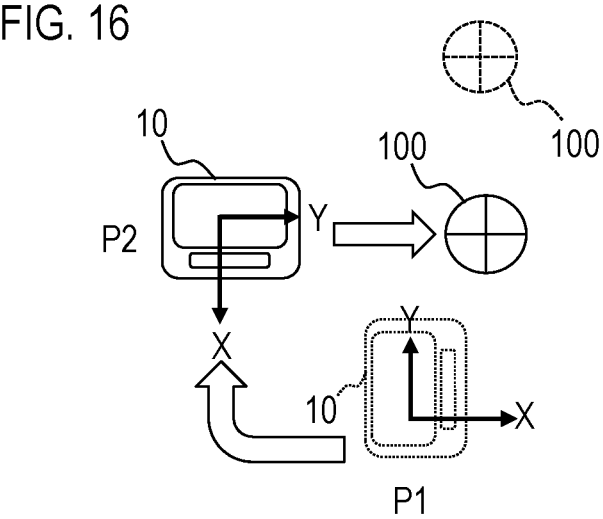
FIG. 16 is a schematic top view illustrating a change in an angular position of a teaching pendant according to an embodiment of the present invention.

As depicted in FIG. 16, teaching pendant is disposed in second position P2 such that the teaching pendant 10 has been re-oriented 90 degrees in a clockwise manner. During this re-orientation, button 220 for the inclination mode is not pressed or otherwise activated. Thus, the robot 100 does not move during the re-orientation from first position P1 to second position P2. A front position of teaching pendant 10 can face a first side of robot 100 following such a re-orientation. While the physical position of teaching pendant 10 is illustrated as moving from a front of robot 100 to a side of robot 100, the change of position from first position P1 to second position P2 does not necessarily involve such a change of physical position. For example, when robot 100 is located at the position illustrated by dashed lines in FIG. 16, the change from first position P1 to second position P2 does not result in the front of teaching pendant 10 facing a side surface of robot 100. Furthermore, a change in position from first position P1 to second position P2 can be employed without moving teaching pendant between multiple positions, but by merely re-orienting teaching pendant 10 by rotating the teaching pendant 10 about the Z axis from the orientation depicted in first position P1 to the orientation depicted in position P2 while the teaching pendant remains in place in a constant position (e.g. first position P1).

Figure 17:
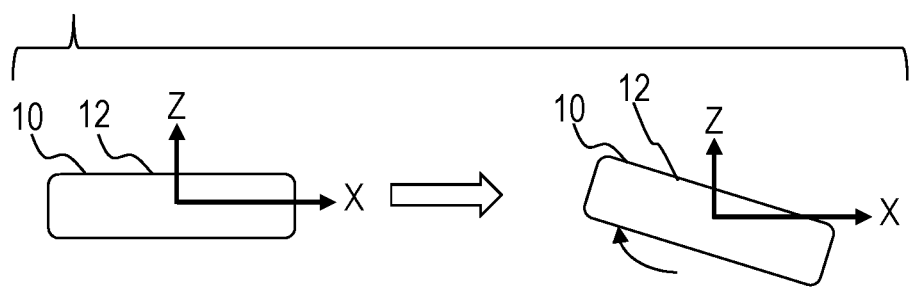
FIG. 17 is a schematic front view illustrating an inclination of a teaching pendant during an inclination teaching mode according to an embodiment of the present invention.

FIG. 17 illustrates a change in inclination in which a left side of the teaching pendant 10 is lifted, in the same manner as illustrated in FIG. 7. As depicted in the right portion of FIG. 17, teaching pendant 10 is rotated about inclination axis Y and inclined with respect to inclination axis X. This movement brings the left side of the pendant closer to the vertical direction Z. During this inclination, teaching pendant 10 is inclined after teaching pendant 10 has been re-oriented to second position P2, as illustrated in FIG. 16.

Figure 18A:
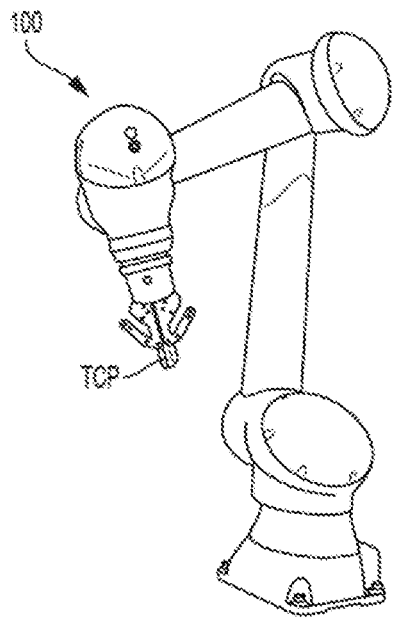
FIGS. 18a and 18b are perspective views illustrating a series of postures of a robot during an inclination teaching mode according to an embodiment of the present invention.
Figure 18B:
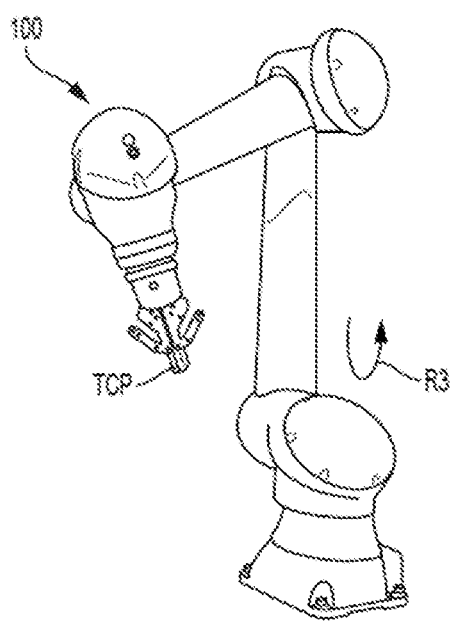

FIGS. 18a and 18b are perspective views illustrating a change in the posture of robot 100 that occurs in response to real-time instructions generated based on to the inclination of teaching pendant 10 depicted in FIG. 17 when located at position P2. When teaching pendant 10 is inclined as depicted in the right portion of FIG. 17, teaching pendant 10 and robot controller 80 continually change the posture of robot 100 such that the posture of the robot begins at the position in FIG. 18a and gradually rotates so as to generally follow the direction R3, in a manner that is substantially the same as the change in posture described above and depicted in FIGS. 15a-15c. This same change in posture is due to the similarity of the inclination of the teaching pendant 10 in FIG. 17 in combination with the angular position of teaching pendant in second position P2 of FIG. 16. This combination corresponds to the combination of the inclination of teaching pendant 10 in FIG. 14 in combination with the angular position of teaching pendant in first position P1 of FIG. 13. Similar to the examples discussed above, the tool center point TCP is held constant at a single position in three dimensions during the rotation of the components of robot 100. While the change in posture of robot can be performed at a constant speed set with speed selector 230, alternatively, the speed of the change of posture of robot 100 can be variable such that the speed changes in real-time based on an amount of inclination. No joystick, lever, or trigger is necessary to change the posture of robot 100 in this manner.

Figure 19:
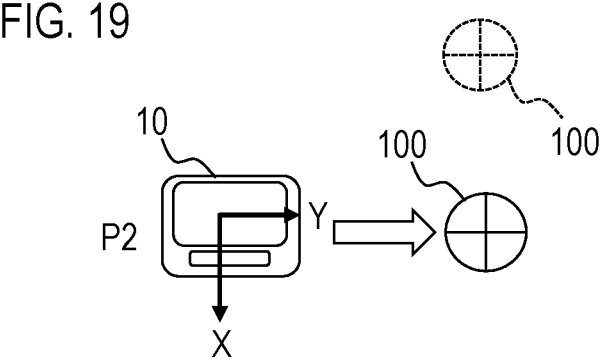
FIG. 19 is a schematic top view illustrating an angular position of a teaching pendant according to an embodiment of the present invention.

As depicted in FIG. 19, teaching pendant can continue to be disposed in second position P2. While the physical position of teaching pendant 10 is illustrated as moving from a front of robot 100 to a side of robot 100, the change of position from first position P1 to second position P2 does not necessarily involve such a change of physical position, as noted above. In the following discussion of FIGS. 19-21b, it is presumed that teaching pendant 10 is inclined after teaching pendant 10 has been re-oriented to second position P2 as illustrated in FIG. 19, similar to the discussion of FIGS. 18a and 18b.

Figure 20:
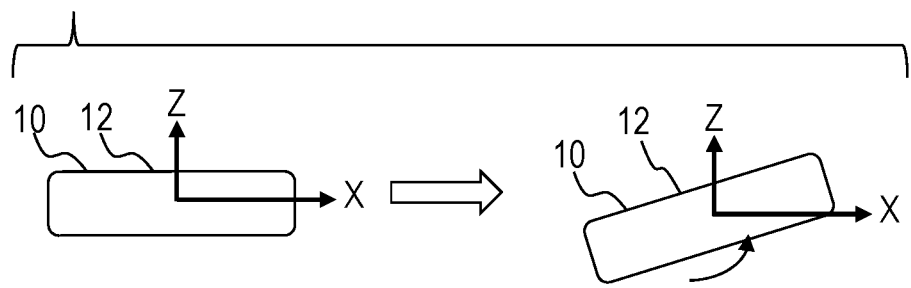
FIG. 20 is a schematic front view illustrating an inclination of a teaching pendant during an inclination teaching mode according to an embodiment of the present invention.

FIG. 20 illustrates a change in inclination in which a right side of the teaching pendant 10 is lifted, in the same manner as illustrated in FIG. 11. As depicted in the right portion of FIG. 20, teaching pendant 10 is rotated in a counterclockwise manner about axis Y. This movement brings the right side of the pendant closer to the vertical direction Z and inclines teaching pendant 10 relative to inclination axis X.

Figure 21A:
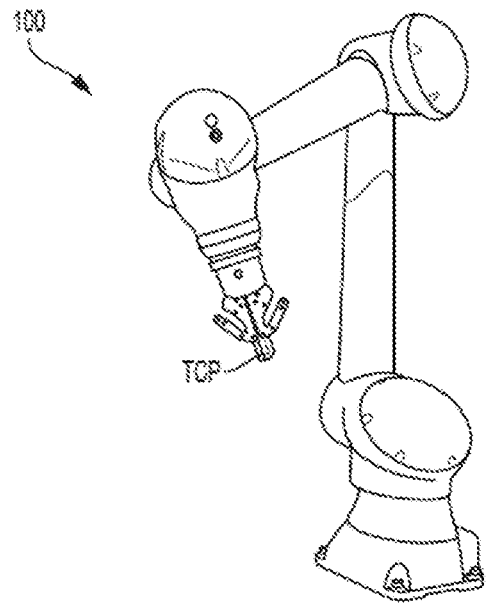
FIGS. 21a and 21b are perspective views illustrating a series of postures of a robot during an inclination teaching mode according to an embodiment of the present invention.
Figure 21B:
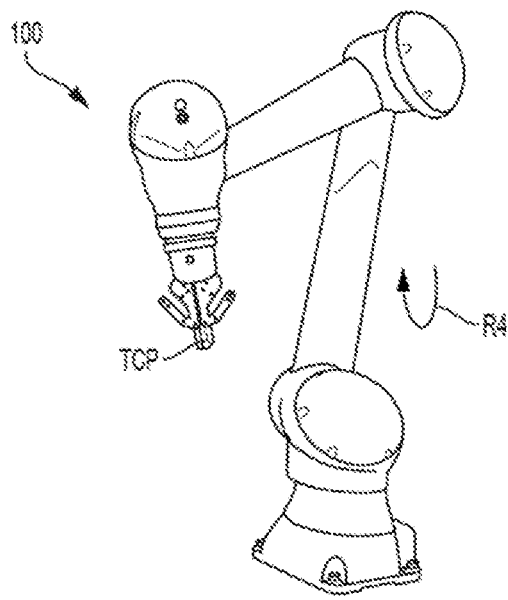

FIGS. 21a and 21b are perspective views illustrating a change in posture of robot 100 that occurs in response to the inclination of teaching pendant 10 depicted in FIG. 20 when located at position P2. When teaching pendant 10 is inclined as depicted in the right portion of FIG. 20, teaching pendant 10 and robot controller 80 continually change the posture of robot 100 such that the posture of the robot begins at the position in FIG. 21a and gradually rotates so as to generally follow the direction R4, which is a counter-clockwise direction with respect to a horizontal axis as viewed from the perspective of FIGS. 21a and 21b. Similar to the examples discussed above, the tool center point TCP is held constant at a single position in three dimensions during the rotation of the components of robot 100. While the change in posture of robot can be performed at a constant speed set with speed selector 230, alternatively, the speed of the change of posture of robot 100 can be variable such that the speed changes in real-time based on an amount of inclination. No joystick, lever, or trigger is necessary to change the posture of robot 100 in this example.

Figure 22:
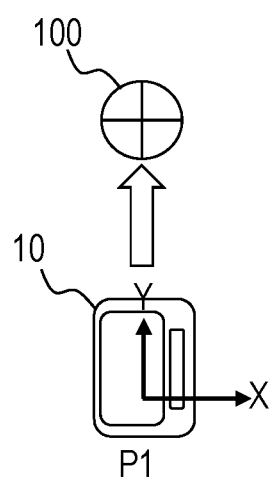
FIG. 22 is a schematic top view illustrating an angular position of a teaching pendant according to an embodiment of the present invention.

The change in posture described above with reference to FIGS. 21a and 21b can also be achieved in first position P1 by tilting a rear of teaching pendant upward, as illustrated in FIGS. 22 and 23. This is due to the combination of the inclination of the teaching pendant 10 in FIG. 19 with the angular position of teaching pendant in second position P2 of FIG. 20. This combination corresponds to the combination of the inclination of teaching pendant 10 in FIG. 22 in combination with the angular position of teaching pendant in first position P1 of FIG. 23.

Figure 24:
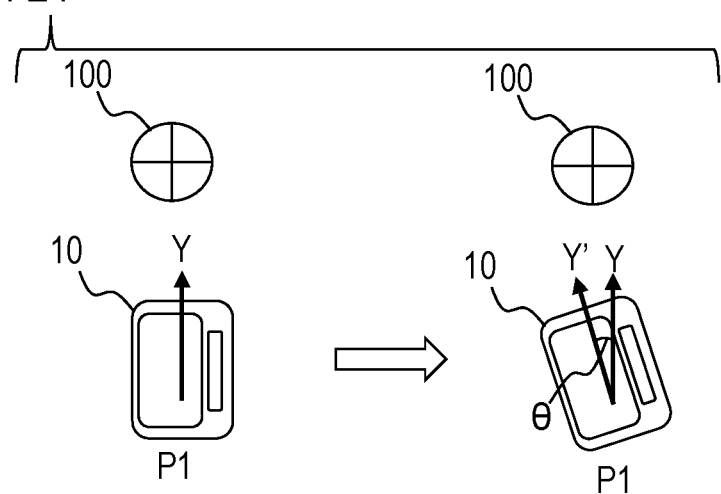
FIG. 24 is a schematic top view illustrating an angular position of a teaching pendant during an inclination teaching mode according to an embodiment of the present invention.

A rotational motion of teaching pendant will now be described with reference to FIGS. 24 and 25a-25c. As illustrated in FIG. 24, teaching pendant 10 is at first position P1, for example. During the rotation described with reference to FIGS. 24 and 25a-25c, it will be presumed that teaching pendant 10 is not inclined about inclination axis X or inclination axis Y. For ease of illustration, inclination axis X is omitted in FIG. 24.

While at first position P1, teaching pendant 10 is rotated about vertical axis Z by an amount represented by angle θ. Teaching pendant 10 is held at a rotated orientation depicted in the right portion of FIG. 24. At this rotated position, axis Y is reoriented to axis Y' by angle θ. This angle θ is calculated or determined by processing unit 30, and is based on the difference between the angular position after rotation (illustrated in the right portion of FIG. 24) as compared to the original angular position (illustrated in the left portion of FIG. 24). When teaching pendant 10 is held at this rotated position, teaching pendant 10 and robot controller 80 continually change the posture of robot 100 such that the posture begins at the position in FIG. 25a and each of the movable links of robot 100, shoulder 106, first arm member 108, second arm member 110, wrist 112 and end effector 120, are driven to the intermediate position depicted in FIG. 25b. The change in posture rotates the end effector 120 in a counter-clockwise direction about axis Ax6. During this motion, the location of tool center point TCP is advantageously held at a single position in three dimensions.

Figure 25A:
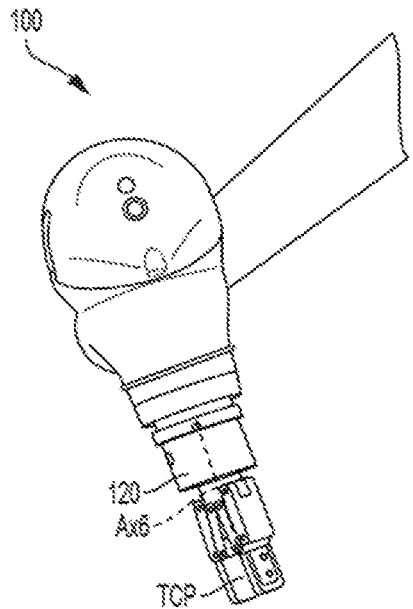
FIGS. 25a-25c are perspective views illustrating a series of postures of a robot during an inclination teaching mode according to an embodiment of the present invention.
Figure 25B:
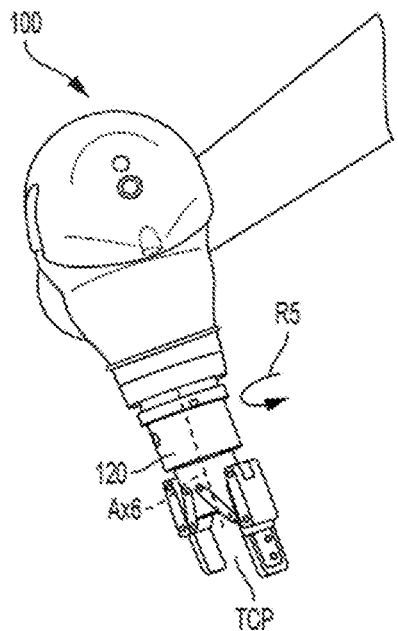
Figure 25C:
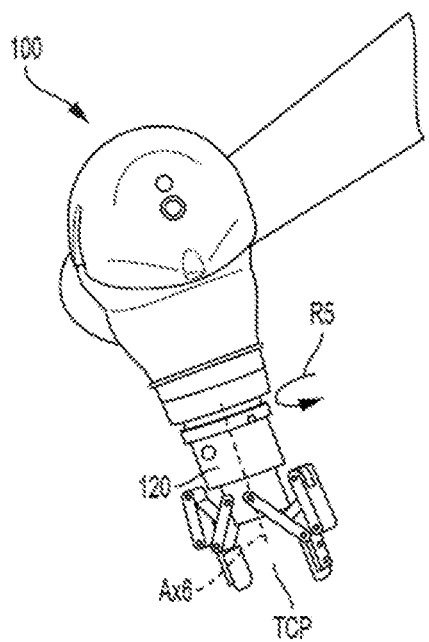

In addition to rotation of end effector 120, the posture of robot 100 can be changed slightly to follow the rotation of teaching pendant 10. This rotation generally is in the direction R5, as illustrated in FIGS. 25b and 25c. As can be seen in FIGS. 25a-25c, while the end effector 120 is rotated along direction R5, the other movable links of robot 100 move relatively slowly to facilitate the re-orientation of robot 100 while tool center point TCP advantageously remains in a single position in three dimensions. An opposite (e.g. clockwise) rotation of teaching pendant 10 beyond the initial position will cause a corresponding opposite (e.g. clockwise) change in posture of robot 100, including end effector 120. The change in posture stops immediately when a virtual button 220 or physical button for entering and maintaining the inclination teaching mode is no longer depressed.

As noted above, the tool center point TCP is preferably held at a single position in three dimensions during each change in posture of the components of robot 100 discussed above and depicted in FIGS. 8a-8c, 12a-12c, 15a-15c, 18a, 18b, 21a, 21b, and 25a-25c. The ability to set the tool center point TCP in a substantially constant position significantly improves the method of altering the posture of robot 100 by allowing a user interacting with teaching pendant 10 to modify the posture of robot 100 in a straightforward manner, without the need to anticipate a change in the position of tool center point TCP.

Furthermore, each of the changes in posture can be performed at a constant speed determined by teaching pendant 10 and/or robot controller 80. Alternatively, a variable speed of the change in posture is determined based on an amount of inclination of teaching pendant 10. Thus, a greater inclination of teaching pendant 10 results in an increased speed of the change in posture of robot 100. A smaller inclination of teaching pendant 10 results in a reduced speed of the change of posture of robot 100. Thus, fine incremental changes in posture can be achieved while providing the ability to swiftly change the posture of the robot 100. As each of the motions of the robot during the inclination teaching mode are performed by inclining the teaching pendant 10 itself and not by inclining an accessory device attached to, or separate from, teaching pendant 10, both hands of an operator can remain on teaching pendant 10. This significantly improves the safety of the teaching operation. Furthermore, the need of additional accessories (e.g. joysticks), wires, etc. is removed, greatly improving the simplicity of the teaching apparatus.

During each of the above-described changes of the posture of robot 100 based on the inclination of teaching pendant 10, each of the movable links of robot 100, shoulder 106, first arm member 108, second arm member 110, wrist 112 and end effector 120, are driven. During the change in posture, the tool center point TCP is advantageously held at a constant position in three dimensions. Each the change in posture stops immediately when a virtual button 220 or physical button for entering and maintaining the inclination teaching mode is no longer depressed.

Although each change of posture described above corresponds to an inclination with respect to a single axis, teaching pendant 10 can be inclined with respect to two axes simultaneously, while robot 100 changes posture to follow the inclination of the teaching pendant 10 accordingly. Thus, teaching pendant 10 can be freely inclined with respect to two inclination axes, inclination axis X and inclination axis Y. Robot 100 is then moved accordingly based on the separate inclinations with respect to each inclination axis during the inclination teaching mode.

While button 220 for the inclination teaching mode is depressed, and the angular portion of teaching pendant 10 is changed, robot 100 is moved accordingly, as discussed above. Thus, during the inclination teaching mode, a posture of robot 10 can be moved in response to an inclination (tilting) of teaching pendant 10 while a button 220 is depressed, and moved in response to a rotation of teaching pendant 10 about a vertical axis while button 220 is depressed. The change in posture of robot 10 advantageously follows the inclination and/or rotation of teaching pendant 10 while button 220 is depressed, and is based on the angular position of teaching pendant 10 when button 220 is initially depressed, as discussed above.

Moreover, if desired, only the inclination of teaching pendant 10 can be considered, while changes in the angular position of teaching pendant 10 are ignored.

Figure 26A:
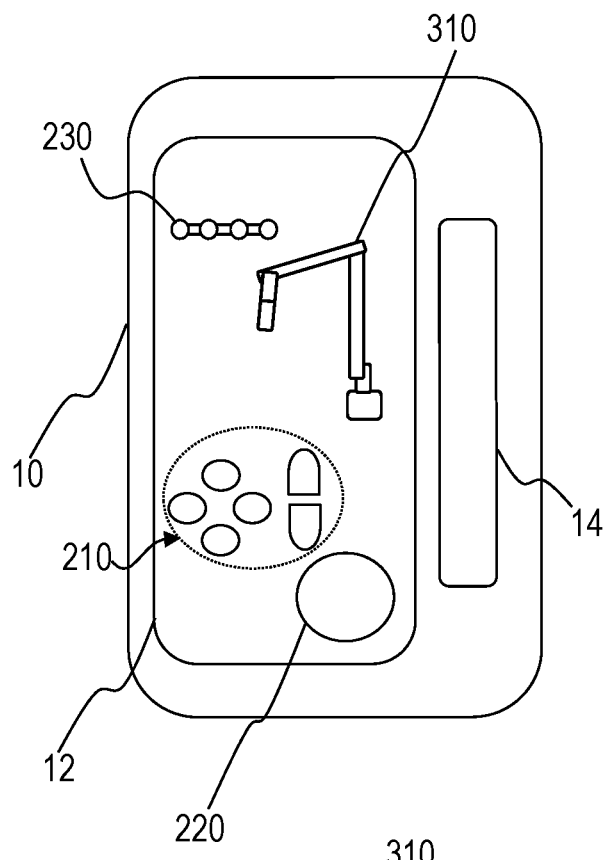
FIG. 26a is a top view illustrating an interactive display of a teaching pendant at a first perspective relative to a robot according to an embodiment of the present invention.
Figure 26B:
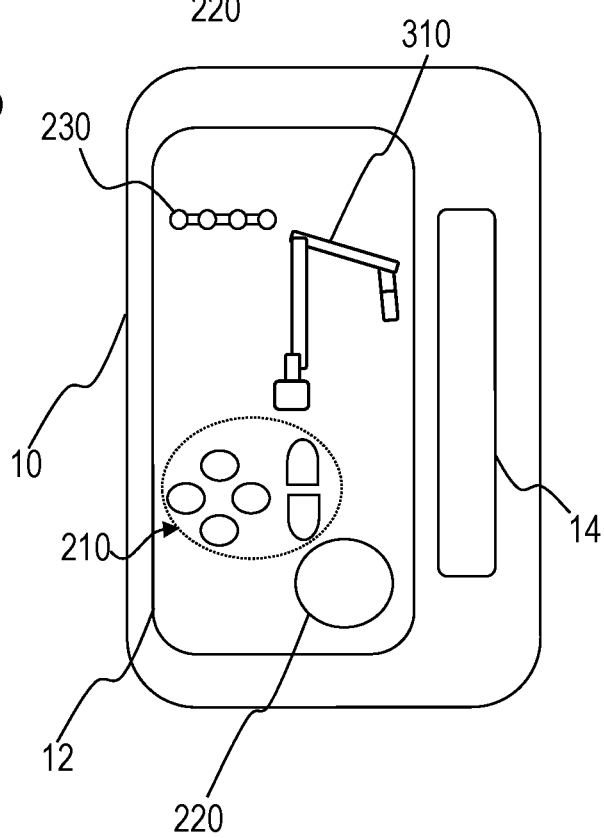
FIG. 26b is a top view illustrating an interactive display of a teaching pendant when the teaching pendant is moved to a second perspective relative to a robot according to an embodiment of the present invention.

In addition to the inclination teaching mode described above, teaching pendant 10 is configured to enter a translation teaching mode. In the translation teaching mode, the tool center point TCP of robot 100 can be translated, or jogged, between various positions in three dimensions. The change in location of the tool center point TCP in three-dimensional space can be performed by interacting with screen 12 or input device 14. For example, as illustrated in FIGS. 26a and 26b screen 12 can display a series of buttons 210 for jogging the tool center point TCP forward, backward, left, right, upward, and downward. One or more of these functions can also be performed by input device 14. Once tool center point TCP is placed in a desired location within the working range of robot 100, the posture of robot 100 can then be changed by entering the inclination teaching mode and modifying the posture of the robot 100 in the manner discussed above.

FIGS. 26a and 26b illustrate an exemplary display of screen 12 used to allow a user to perform the inclination teaching mode and the translation teaching mode. As illustrated in FIGS. 26a and 26b, screen 12 displays interactive elements that allow a user to enter the inclination teaching mode, translation teaching mode, edit teaching points, etc. A button 220 for causing the teaching pendant 10 to enter the inclination teaching mode is presented in a lower-right portion of screen 12. For example, while a user depresses button 220, inclination and/or rotation of teaching pendant 10 results in a corresponding motion of robot 100. This motion stops immediately in response to a determination by processing unit 30 that button 220 is no longer depressed. A speed selector 230, is presented as a slider or series of buttons, for example. Speed selector 230 allows a user to determine a relative speed of the motion of robot 100 in response to inclination and/or rotation of teaching pendant 10 during the inclination teaching mode such that a change in posture of robot 100 is performed at a constant speed during the inclination of teaching pendant 10. Speed selector 230 can also determine a speed of the translational motion of tool center point TCP during the translation teaching mode. If desired, a second button separate from button 220 can be dedicated for causing rotational motion as discussed above with respect to FIGS. 24 and 25a-25c.

Screen 12 also displays a series of translation buttons 210 for achieving the translation teaching mode. These translation buttons 210 are interactive elements of screen 12, like button 220 and speed selector 230. Translation buttons 210 include, for example interactive buttons for moving tool center point TCP left, right, forward, and backward. The actual direction of the translation of tool center point TCP is based on the orientation of teaching pendant 10, as discussed in detail above. Translation buttons 210 can also include a pair of buttons for raising and lowering tool center point TCP. As is clear from FIGS. 26a and 26b, teaching pendant 10 allows a user to fluidly employ both the inclination teaching mode and the translation teaching mode. If desired, a user can switch between these modes without the need to navigate menus or perform repetitive interactions with display 12 as display 12 presents a user with button 220 for employing the inclination teaching mode and separate translation buttons 210 for translating tool center point TCP in the translation teaching mode.

Thus, a user can readily switch between the translation teaching mode and the inclination teaching mode to teach a plurality of postures of robot 100, while specifying a series of corresponding tool center points TCP, to bring about a desired operation of robot 100 for subsequent autonomous operation. For example, button 220 readily allows a user to enter the inclination teaching mode without navigating a series of prompts or menus. Once at least one teaching point and the corresponding tool center point(s) have been specified by using teaching pendant 10, the series of teaching points can be stored in robot controller 80 to allow robot 100 to autonomously perform one or more tasks. Thus, a job made of one or more tasks is easily created for instructing robot 100.

Screen 12 is also controlled by processing unit 30 to display a virtual robot 310, as illustrated in FIGS. 26a and 26b. The virtual robot 310 is a virtual representation of the actual robot 100, and depicts each of the links of robot 100, as well as end effector 120. The base of robot 100 can also be included in the displayed virtual robot 310. By using the orientation determined by compass sensor 24 alone, or with gyroscope 26 for even greater accuracy, teaching pendant 10 changes the display of virtual robot 310 according to the movement of the teaching pendant 10 relative to the robot. This is achieved by calculating an orientation matrix by processing unit 30, as described above. While virtual robot 310 occupies a portion of the display of screen 12 in FIGS. 26a and 26b, the virtual robot 310 can occupy substantially the entire screen 12.

FIG. 26a illustrates a three-dimensional virtual robot 310 when viewed from a first perspective. For example, virtual robot 310 in FIG. 26a corresponds to the perspective of teaching pendant 10 facing robot 100 from fourth position P4 of FIG. 5. When teaching pendant 10 is moved from the first perspective, (corresponding to position P4 of FIG. 5 in this example), to a second perspective (corresponding to position P2 of FIG. 5 in this example), the three-dimensional virtual robot 310 displayed on screen 12 changes according to this change in perspective. Virtual robot 310 therefore changes in accordance with the perspective of teaching pendant 10.

In the above-described example FIG. 26b corresponds to a second perspective of teaching pendant 10 facing robot 100 from second position P2 of FIG. 5. Thus, by moving from position P4 to position P2 in this example, the perspective of teaching pendant 10 changes by about 180 degrees. Accordingly, as illustrated in FIG. 26b, three-dimensional virtual robot 310 is presented from a different perspective that is about 180 degrees different from the first perspective.

Thus, the perspective of the display of three-dimensional virtual robot 310 changes in accordance with the change in perspective of a user using teaching pendant 10. This change in perspective is particularly advantageous when employed in conjunction with the inclination teaching mode. This advantageously allows for confirmation of an orientation of teaching pendant 10 relative to robot 100 prior to changing the posture of the robot 100 via the inclination teaching mode. Thus, an inclination of teaching pendant 10 during the inclination teaching mode does not result in an unexpected motion of robot 100, improving the safety and efficiency of the teaching operation.

A process for intuitively modifying a position of tool center point TCP in the translation teaching mode will now be described. In this example, the translation teaching mode can be entered by pressing a dedicated button on screen 12 or input device 14, by navigating a menu, or by releasing a physical or virtual button that causes teaching pendant 10 to enter the inclination teaching mode.

Figure 27:
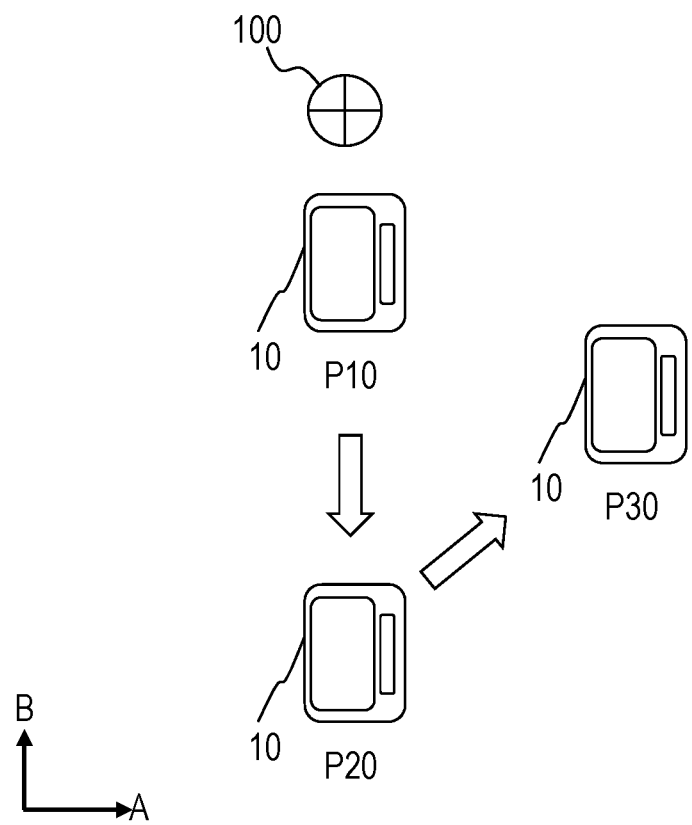
FIG. 27 is a schematic top view illustrating a translational movement of a teaching pendant with respect to a robot during a translation teaching mode according to an embodiment of the present invention.
Figure 28:
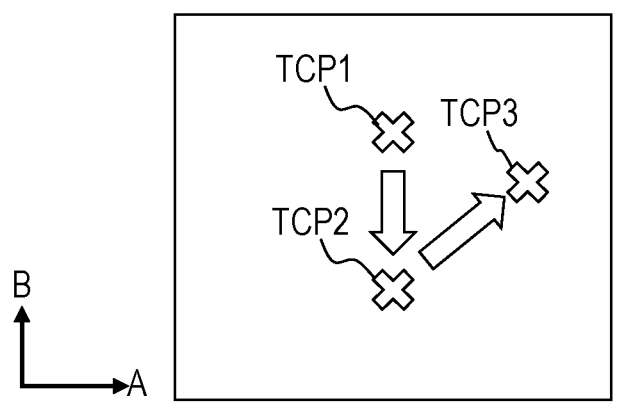
FIG. 28 is a schematic view illustrating a change a tool center point during the translational movement of the teaching pendant illustrated in FIG. 24.

Advantageously, the translation teaching mode can be employed to change the tool center point TCP by physically translating teaching pendant 10, as illustrated in FIGS. 27 and 28. FIG. 27 illustrates a change in physical position (translational motion) of teaching pendant 10. In first translational position P10, teaching pendant 10 is located in front of robot 100. Teaching pendant 10 is then moved in a direction away from the front of robot 100 (−B direction) to second translational position P20. Finally, as illustrated in FIG. 27, teaching pendant 10 is moved diagonally with respect to robot 100 in a direction toward the robot (B direction) and away from the robot (A direction). In each exemplary movement of teaching pendant 10, robot 100 is moved in a manner the follows the movement of the teaching pendant 10. Teaching pendant 10 can be moved in upward and downward direction corresponding to a vertical direction, in addition to the A direction and B direction. This allows for placement of tool center point TCP as desired in three dimensional space. Each of the translational positions P10, P20, and P30 can be detected by visual sensor 212 to improve the accuracy of the detection of the movement of teaching pendant 10.

FIG. 28 is a schematic view illustrating a change in tool center point TCP based on the change in physical position of teaching pendant 10 discussed above with respect to FIG. 27. As can be seen in FIG. 28, tool center point TCP is moved from a first position TCP1 corresponding to first translational position P10 to a second position TCP2 corresponding to second translational position P20 and to a third position TCP3 corresponding to a third translational position P30. Robot 100 can be moved such that each of the movable links of robot 100, shoulder 106, first arm member 108, second arm member 110, wrist 112 and end effector 120 are brought into motion to move tool center point TCP according to the translational movement of teaching pendant 10. Vertical (upward and downward along direction Z) movement of tool center point TCP can be achieved by interacting with screen 12 input device 14, or by employing a visual sensor 212 that is configured to detect a vertical distance of teaching pendant 10 in additional to the location of the teaching pendant in the X and Y plane.

Figure 13:
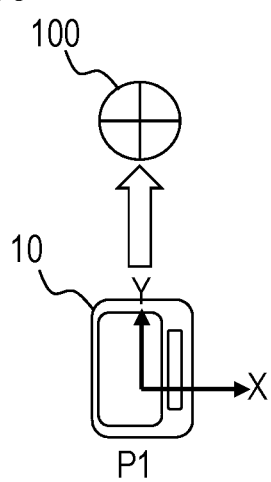
FIG. 13 is a schematic top view illustrating an angular position of a teaching pendant according to an embodiment of the present invention.

Alternatively, instead of physically translating teaching pendant 10, the translation teaching mode can allow for the modification of the position of tool center point by inclining the teaching pendant 10. Unlike the inclination teaching mode, during a translation teaching mode, the tool center point TCP can be moved so as to follow the inclination of the teaching pendant 10. Thus, the translation teaching mode allows a user to translate tool center point TCP. For example, a downward inclination with respect to direction B, as depicted in FIGS. 13 and 14, can move tool center point TCP along direction B, thereby moving from TCP1 to TCP2. Furthermore, the movement of the tool center point TCP can be based on an angular position of teaching pendant 10 in combination with the inclination of teaching pendant 10, in a manner similar to the inclination teaching mode.

The above-described translation teaching mode can employ an amount of inclination to affect the speed of the change in tool center point TCP of robot 100. No joystick, lever, or trigger is necessary to change the position of tool center point TCP in this example.

Figure 29:
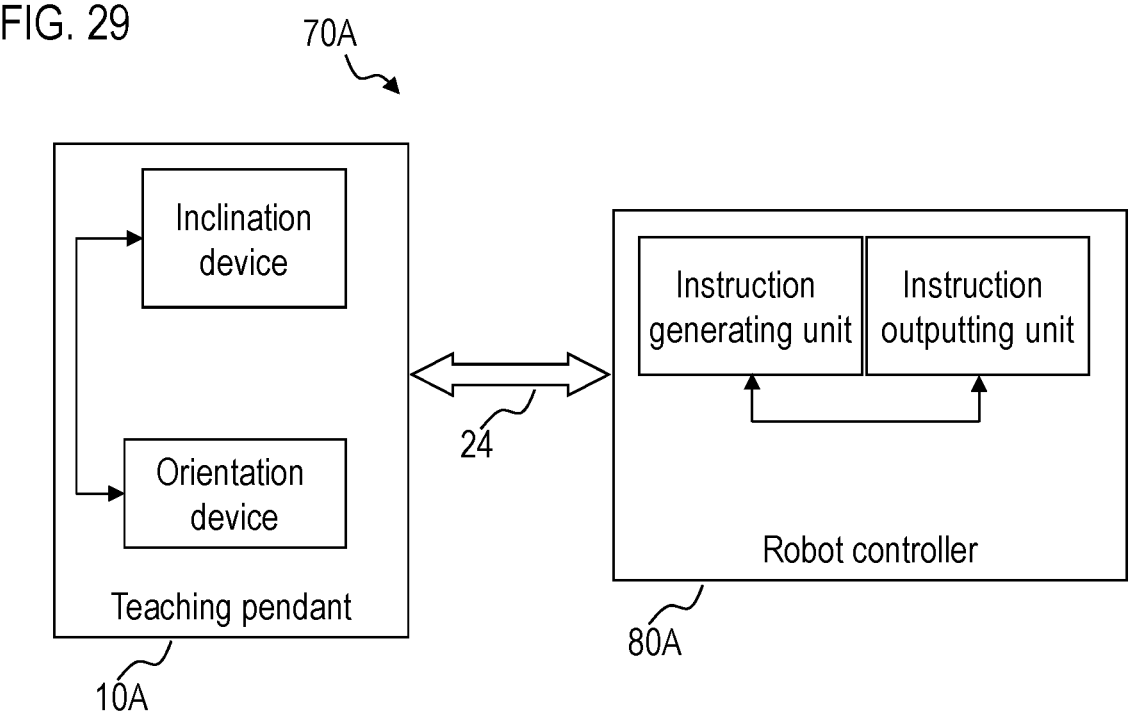
FIG. 29 is a block diagram illustrating an alternate configuration of a teaching pendant and robot controller according to an embodiment of the present invention.

An alternate configuration of a robot instructing apparatus 70A including a teaching pendant 10A and a robot controller 80A will now be described. FIG. 29 provides a block diagram of the relationship between the hardware components of a teaching pendant 10A and the robot controller 80A. The teaching pendant 10A includes an inclination device and an orientation device, similar to the configuration of FIG. 3. However, robot controller 80A performs an entirety of the generation of instructions for robot 100. Thus, robot controller 80A includes an instruction generating unit formed by one or more processors, and an instruction outputting unit formed by one or more output devices in communication with robot 100 via second communication medium 240. This configuration allows a significant reduction in the processing load placed on processing unit of teaching pendant 10A.

Figure 30:
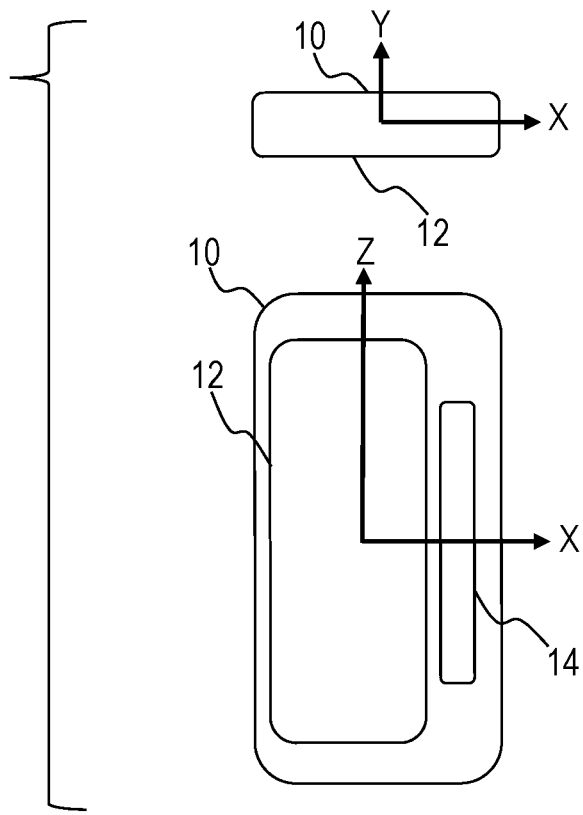
FIG. 30 is a schematic top view and a schematic front view of a teaching pendant illustrating exemplary inclination axes during a calibration according to an embodiment of the present invention.

FIG. 30 illustrates a technique for determining an inclination of teaching pendant 10. This technique corresponds to the technique discussed above with respect to FIG. 4. FIG. 30 provides a top view (upper portion of FIG. 30) and front view (lower portion of FIG. 30) of teaching pendant 10. Unlike FIG. 4, teaching pendant 10 is held in a substantially vertical manner relative to a user in FIG. 30 such that the screen 12 extends primarily along a vertical direction. When the calibration process is performed with teaching pendant 10 in the position illustrated in FIG. 30, inclination will be determined in based on an inclination about inclination axis X and/or inclination axis Y. Thus, inclination axes X and Y can be set as desired by re-orienting teaching pendant 10 during calibration to arrive at a desired zero position.

A process 500 for instructing a robot 100 will now be described with reference to FIG. 31. Teaching pendant 10 corresponds to the remote device of process 500. At the beginning of process 500, robot teaching is initiated by starting or providing power to teaching pendant 10 in step S12. Robot controller 80 can also be powered on during step S12. Teaching pendant 10 and robot controller 80 thereafter begin communication with each other via communication medium 140. When teaching pendant 10 communicates directly with robot 100 without robot controller 80, step S12 can complete once the initialization of teaching pendant 10 itself has finished. The initialization of step S12 can include the establishment of direct wired or wireless communication between teaching pendant 10 and robot 100. Once this initialization is complete, a notification can be provided on screen 12.

An optional step S14 can be performed once the initialization performed in step S12 is completed. During step S14 teaching pendant 10 is calibrated. This can be performed by the presentation of a prompt on screen 12, allowing a user to begin calibration of teaching pendant 10. Once this calibration has begun, a user can then be directed, via a prompt on screen 12, to position teaching pendant 10 in a desired zero position. While the teaching pendant 10 is positioned in the desired zero position, signals from accelerometer 22, compass sensor 24, and gyroscope 26 of inertial measurement unit 20 are employed to determine the angular position and inclination of teaching pendant 10. Thus, inertial measurement unit 20 outputs signals allowing teaching pendant 10 to detect changes in the acceleration and position during subsequent steps. While any zero position can be employed, exemplary zero positions are illustrated in FIGS. 4 and 30. A user may repeat the calibration process of step S14 if the results are unsatisfactory or if conditions change. If optional step S14 is not performed, teaching pendant 10 may use a stored zero position that is constituted by default values stored in storage device 50 or by a calibration that was performed previously and stored in storage device 50. As discussed above, the calibration process of step S14 can be advantageously omitted by providing an additional compass sensor in robot 100.

Following step S12 or step S14, process 500 proceeds to step S16 and teaching pendant 10 enters at least an inclination teaching mode. During the inclination teaching mode, the inclination and angular position of the teaching pendant 10 are both determined to change a posture of the robot 100 while button 220 is depressed. Advantageously the location of tool center point TCP is not modified during the inclination teaching mode in which the inclination of the robot 100 is modified. During the translation teaching mode, a location of tool center point TCP can be modified, by interacting with the screen 12 or input device 14, or by physical moving teaching pendant 10. Thus, by alternately entering the inclination teaching and translation teaching modes, robot 100 can be brought into a desired posture. As discussed in detail above, during the inclination teaching mode, a posture of robot 100 is set based on the inclination and angular position of the teaching pendant 10. Alternatively, only the inclination of teaching pendant 10 can be considered, while changes in the angular position are ignored.

Thus, during step S16, teaching pendant 10 determines the inclination of the teaching pendant 10 via the signal output by accelerometer 22, compass sensor 24, and gyroscope 26. The signals output from accelerometer 22, compass sensor 24, and gyroscope 26 of IMU 20 are processed by processing unit 30 to determine the inclination and orientation of the teaching pendant.

During step S18, changes in the inclination and/or position of teaching pendant 10 are employed to change the physical posture of robot 100. Step S18 is preferably performed concurrently with step S16 as teaching pendant 10 is operated to modify the posture of robot 100 in real-time. During the performance of steps S16 and S18, the inclination and angular position of teaching pendant 10 is continually monitored by processing unit 30. Thus, teaching pendant 10 can be inclined and moved freely in three dimensions in order to modify the posture of robot 100.

Advantageously, the speed of the change in posture during step S18 can be based on a speed set by interacting with speed selector 230. Alternatively, speed can be based at least in part in accordance with an amount of inclination of teaching pendant 10. Thus, a greater inclination of teaching pendant 10 results in an increased speed of the change in posture of robot 100. Fine incremental changes in posture can thereby be achieved while providing the ability to swiftly change the posture of the robot 100.

Once robot 100 has been brought into a desired posture, the desired posture can be set as a teaching point in step S20. This set teaching point can be stored in storage device 50 or in a storage device of robot controller 80. Process 500 then proceeds to step S22.

In step S22, based on the series of teaching points set previously, teaching pendant 10 and robot controller 80 generate job instructions (movement instructions). These job instructions can be generated by teaching pendant 10 and output to robot controller 80 (see FIG. 3) for subsequent output to robot 100, or generated by the robot controller for subsequent output by the same robot controller (see robot controller 80A, FIG. 29). The job instructions are based on at least one teaching point so as to form one or more jobs that robot 100 can perform in an autonomous or semi-autonomous manner. Thus, robot 100 can be easily and rapidly configured to perform a variety of complicated tasks, even by a user with no knowledge of robot programming or coding. During step S22, each teaching point can be modified, reordered, or deleted as desired to define desired job instructions.

Subsequently, in step S24, it is determined whether additional teaching points are desired. This can be performed by presenting a prompt to a user via screen 12, and/or by an interaction with input device 14. If additional teaching points are necessary or desired, the process 500 returns to step S16. This allows for the designation of additional teaching points by using the inclination teaching mode and translation teaching mode.

When no additional teaching points are necessary or desired, process 500 concludes. At the conclusion of process 500, each of the teaching points set in the course of performing steps S16-S24 are stored in storage 50 or in a storage of teaching pendant 10.

Advantageously, in the system 1, robot instructing apparatus 70, 70A, teaching pendant 10, and process 500 discussed herein, no joystick or other accessory is required to change the posture of robot 100. In fact, no physical manipulator is required to change the posture of robot 100. This significantly improves the ease with which the teaching pendant 10 is able to generate job instructions for a robot by placing the robot in a series of postures.

The robot teaching apparatus 70 and teaching pendant 10 eliminate the need to modify the posture of the robot in a robot coordinate system, greatly simplifying the process of bringing the robot into a desired posture and thereby teaching a series of teaching points (teaching postures) to the robot to allow the robot to perform a task or job.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A robot instructing apparatus for a robot, the robot instructing apparatus comprising:
   a teaching pendant having a display;
   an inclination device configured to output an inclination of the teaching pendant based on the inclination of the teaching pendant about at least one horizontal axis;
   an orientation device configured to output an orientation of the teaching pendant based on a rotation of the teaching pendant about a vertical axis; and
   at least one processor configured to generate movement instructions to change a posture of the robot based on the inclination of the teaching pendant output by the inclination device during a teaching operation in which the movement instructions are generated, the at least one processor is further configured to generate the movement instructions based on the orientation of the teaching pendant output by the orientation device,
   wherein the at least one processor is configured to generate the movement instructions for the robot including an end effector having a tool center point,
   wherein the at least one processor is configured to generate the movement instructions such that a change in an inclination of the end effector in response to the movement instructions matches a direction of the inclination of the teaching pendant about the at least one horizontal axis as output by the inclination device, and
   wherein the at least one processor is configured to generate the movement instructions in:
      an inclination teaching mode in which the change in the inclination of the end effector, in response to the movement instructions, matches the direction of the inclination of the teaching pendant about the at least one horizontal axis; and
      a translation teaching mode in which a translational change of the end effector, in response to the movement instructions, matches an input direction input to the teaching pendant by a user relative to the orientation of the teaching pendant.

2. The robot instructing apparatus according to claim 1, wherein the at least one processor is configured to cause the teaching pendant to enter the teaching operation based on an interaction with the display.

3. The robot instructing apparatus according to claim 2, wherein the tool center point is disposed at a tip end of the end effector, and
   wherein the at least one processor is configured to generate the movement instructions such that the change in position of the end effector is instructed based on the inclination of the teaching pendant output by the inclination device and the orientation of the teaching pendant output by the orientation device while the tool center point of the robot is held constant at a single position with respect to an X-axis, a Y-axis, and a Z-axis.

4. The robot instructing apparatus according to claim 3, wherein the movement instructions are real-time instructions to change a posture of the robot during the teaching operation.

5. The robot instructing apparatus according to claim 4, wherein the inclination device and the orientation device are formed by an inertial measurement unit, and
   wherein the at least one processor is configured to generate the real-time instructions such that a direction of the change in the posture of the robot is based on the inclination of the teaching pendant output by the inclination device and the orientation of the teaching pendant output by the orientation device.

6. The robot instructing apparatus according to claim 1, wherein the movement instructions are real-time instructions to change a posture of the robot during the teaching operation.

7. The robot instructing apparatus according to claim 6, wherein the inclination device is formed by an inertial measurement unit that includes an accelerometer, a compass sensor, and a gyroscope.

8. The robot instructing apparatus according to claim 6, wherein the at least one processor is configured to generate the real-time instructions based on an interaction with the display,
   wherein the at least one processor is configured to stop the generation of the real-time instructions based on a subsequent interaction with the display, and
   wherein the at least one processor is configured to cause the display to display a virtual representation of the robot and change a perspective of the display of the virtual representation of the robot to correspond to a change in the orientation of the teaching pendant.

9. The robot instructing apparatus according to claim 1, wherein the movement instructions are job instructions to change the posture of the robot during a subsequent operation of the robot.

10. The robot instructing apparatus according to claim 1, wherein the at least one processor is configured to generate the movement instructions based on the inclination of the teaching pendant performed without a joystick connected to the teaching pendant.

11. A teaching pendant for a robot, the teaching pendant comprising:
- a display;
- an inclination sensor configured to output an inclination of the teaching pendant with respect to at least one horizontal axis;
- an orientation sensor configured to output an orientation of the teaching pendant based on a rotation of the teaching pendant about a vertical axis; and
- circuitry configured to:
  - generate movement instructions based on the inclination of the teaching pendant output by the inclination sensor, and
  - output the movement instructions to change a posture of the robot during a teaching operation based on the inclination of the teaching pendant output by the inclination sensor, the circuitry is further configured to generate the movement instructions based on the orientation of the teaching pendant output by the orientation sensor,
- wherein the circuitry is configured to generate the movement instructions for the robot including an end effector having a tool center point,
- wherein the circuitry is configured to generate the movement instructions such that a change in an inclination of the end effector in response to the movement instructions matches a direction of the inclination of the teaching pendant about the at least one horizontal axis as output by the inclination sensor, and
- wherein the circuitry is configured to generate the movement instructions in:
  - an inclination teaching mode in which the change in the inclination of the end effector, in response to the movement instructions, matches the direction of the inclination of the teaching pendant about the at least one horizontal axis; and
  - a translation teaching mode in which a translational change of the end effector, in response to the movement instructions, matches an input direction input to the teaching pendant by a user relative to the orientation of the teaching pendant.

12. The teaching pendant according to claim 11, wherein the circuitry is configured to cause the teaching pendant to enter the teaching operation based on an interaction with the display.

13. The teaching pendant according to claim 12, wherein the tool center point is disposed at a tip end of the end effector, and
wherein the circuitry is configured to generate the movement instructions such that the change in position of the end effector is instructed based on the inclination of the teaching pendant output by the inclination sensor and the orientation of the teaching pendant output by the orientation sensor while the tool center point of the robot is held constant at a single position with respect to an X-axis, a Y-axis, and a Z-axis.

14. The teaching pendant according to claim 13, wherein the movement instructions are real-time instructions to change a posture of the robot during the teaching operation.

15. The teaching pendant according to claim 14, wherein the inclination sensor and the orientation sensor are included in an inertial measurement unit,
wherein the circuitry is configured to generate the real-time instructions such that a direction of the change in the posture of the robot is based on the inclination of the teaching pendant output by the inclination sensor and the orientation of the teaching pendant output by the orientation sensor, and
wherein the circuitry is configured to cause the display to display a virtual representation of the robot and change a perspective of the display of the virtual representation of the robot to correspond to a change in the orientation of the teaching pendant.

16. The teaching pendant according to claim 11, wherein the circuitry is configured to generate the movement instructions based on the inclination of the teaching pendant performed without a joystick connected to the teaching pendant.

17. A method of instructing a robot, said method comprising:
- determining an inclination of a teaching pendant with respect to at least one horizontal axis by an inclination sensor, the teaching pendant having a display configured to cause the teaching pendant to enter a teaching operation based on an interaction with the display;
- determining an orientation of the teaching pendant about a vertical axis with an orientation sensor; and
- generating movement instructions to change a posture of the robot including an end effector having a tool center point based on the determined inclination of the teaching pendant and the determined orientation of the teaching pendant,
- wherein the movement instructions are generated such that a change in an inclination of the end effector in response to the movement instructions matches a direction of the inclination of the teaching pendant about the at least one horizontal axis as output by the inclination sensor, and
- wherein the movement instructions are generated in:
  - an inclination teaching mode in which the change in the inclination of the end effector, in response to the movement instructions, matches the direction of the inclination of the teaching pendant about the at least one horizontal axis; and
  - a translation teaching mode in which a translational change of the end effector, in response to the movement instructions, matches an input direction input to the teaching pendant by a user relative to the orientation of the teaching pendant.

18. The method of instructing a robot according to claim 17,
wherein the movement instructions are generated such that a direction of the change in the posture of the robot is based on the inclination determined by the inclination sensor and the orientation determined by the orientation sensor while the tool center point of the robot is held constant at a single position with respect to an X-axis, a Y-axis, and a Z-axis.

19. The robot instructing apparatus according to claim 1, wherein the at least one processor is configured to generate the movement instructions such that the change in inclination of the end effector is instructed based on the inclination of the teaching pendant output by the inclination device about the at least one horizontal axis while the tool center point of the robot is held constant at a single position with respect to an X-axis, a Y-axis, and a Z-axis.

20. The robot instructing apparatus according to claim 1, wherein the at least one processor is configured to generate the movement instructions in the translation teaching mode based upon the input direction in a horizontal plane such that the translational change of the end effector is in the horizontal plane.

21. The teaching pendant according to claim 11, wherein the circuitry is configured to generate the movement instructions in the translation teaching mode based upon the input direction in a horizontal plane such that the translational change of the end effector is in the horizontal plane.

22. The method of instructing a robot according to claim 17, wherein the movement instructions are generated in the translation teaching mode based upon the input direction in a horizontal plane such that the translational change of the end effector is in the horizontal plane.

* * * * *